July 14, 1959 W. D. HAILES 2,895,042

RAILWAY SIGNALING SYSTEM FOR THE PROTECTION OF TRAINS INCAPABLE OF RELIABLY SHUNTING TRACK CIRCUITS

Filed April 27, 1956 8 Sheets-Sheet 1

INVENTOR.
W.D.HAILES
BY
Forest B. Hitchcock
HIS ATTORNEY

July 14, 1959 W. D. HAILES 2,895,042

RAILWAY SIGNALING SYSTEM FOR THE PROTECTION OF TRAINS INCAPABLE OF RELIABLY SHUNTING TRACK CIRCUITS

Filed April 27, 1956 8 Sheets-Sheet 2

INVENTOR.

W. D. HAILES

BY

Forest B. Hitchcock

HIS ATTORNEY

July 14, 1959 W. D. HAILES 2,895,042

RAILWAY SIGNALING SYSTEM FOR THE PROTECTION OF TRAINS INCAPABLE OF RELIABLY SHUNTING TRACK CIRCUITS

Filed April 27, 1956 8 Sheets-Sheet 3

*INVENTOR.*

W.D.HAILES

*BY* Forest B. Hitchcock

HIS ATTORNEY

INVENTOR.
W.D.HAILES
BY
Forest B. Hitchcock
HIS ATTORNEY

July 14, 1959 W. D. HAILES 2,895,042

RAILWAY SIGNALING SYSTEM FOR THE PROTECTION OF TRAINS INCAPABLE OF RELIABLY SHUNTING TRACK CIRCUITS

Filed April 27, 1956 8 Sheets-Sheet 5

*INVENTOR.*

W.D.HAILES

*BY* Forest B. Hitchcock

HIS ATTORNEY

July 14, 1959 W. D. HAILES 2,895,042
RAILWAY SIGNALING SYSTEM FOR THE PROTECTION OF TRAINS
INCAPABLE OF RELIABLY SHUNTING TRACK CIRCUITS
Filed April 27, 1956 8 Sheets-Sheet 6

INVENTOR.
W.D.HAILES
BY
Forest B. Hitchcock
HIS ATTORNEY

COUNTING RELAY SEQUENCE CHART

| | P1 | E1 | E2 | E3 |
|---|---|---|---|---|
| 0 | ↑ | ↓ | ↓ | ↑ |
| 1 | ↓ | ↑ | ↓ | ↑ |
| 2 | ↑ | ↑ | ↑ | ↑ |
| 3 | ↓ | ↓ | ↑ | ↑ |
| 4 | ↑ | ↓ | ↑ | ↓ |
| 5 | ↓ | ↑ | ↑ | ↓ |
| 6 | ↑ | ↑ | ↓ | ↓ |
| 7 | ↓ | ↓ | ↓ | ↓ |
| 8 | ↑ | ↓ | ↓ | ↑ |

INVENTOR.
W.D.HAILES
BY
Forest B. Hitchcock
HIS ATTORNEY

July 14, 1959 W. D. HAILES 2,895,042

RAILWAY SIGNALING SYSTEM FOR THE PROTECTION OF TRAINS INCAPABLE OF RELIABLY SHUNTING TRACK CIRCUITS

Filed April 27, 1956 8 Sheets-Sheet 8

INVENTOR.
W.D.HAILES
BY
Forest B. Hitchcock
HIS ATTORNEY

United States Patent Office 2,895,042

Patented July 14, 1959

2,895,042

RAILWAY SIGNALING SYSTEM FOR THE PROTECTION OF TRAINS INCAPABLE OF RELIABLY SHUNTING TRACK CIRCUITS

William D. Hailes, Rochester, N.Y., assignor to General Railway Signal Company, Rochester, N.Y.

Application April 27, 1956, Serial No. 581,146

17 Claims. (Cl. 246—33)

This invention relates to railway signaling systems and relates more particularly to railway signaling systems in which the detection of trains is not dependent upon the ability of such trains to produce continuous effective shunts in detector track circuits.

Contemporary railway signaling systems either include or exclude track circuits for detecting trains and providing signaling protection for such trains. Where some systems employ track circuits widely, other systems employ track circuits at switch and signal locations only. Still other systems, such as the manual block type, depend upon visual train identification by wayside dispatchers who are in communication with each other and who control the signals in accordance with known track conditions.

In systems employing track circuits, the integrity of operation of the system is dependent upon the ability of the track circuits to respond to train shunts. The modern trend toward the use of high speed lightweight trains creates a problem in that such trains make poorer contact with rail surfaces, thereby effectively raising the resistance of shunts produced by such trains. Since such trains are unreliable in their ability to effectively operate standard track circuits, the solution to the problem resides either in the providing of special highly sensitive track circuits or in the providing of other means for detecting the trains.

In view of the preceding considerations, the present invention provides train detection means which can be used either independently or in conjunction with track circuits. Specifically, the present invention provides train detection means including train-carried check-in and check-out apparatus and wayside detection check-in and check-out apparatus which cooperate during the passage of a train to detect the presence of the train. Way-side apparatus is provided at each signal location, and train-carried apparatus is provided at both the front and the rear of a train. The characteristics of the front and rear train-carried apparatus differ so that they are capable of operating wayside detection apparatus in different manners, thereby providing means for detecting both the front and the rear of each train. In this manner, it can be determined at each signal location or check point whether or not a passing train is complete and intact.

The present invention is arranged so that the detection of the passage of the front of the train at a signal location causes the signal to be operated to display a stop aspect. The stop aspect will continue to be displayed until the rear of the train is detected passing the next signal location in advance. In this manner, a signal is operated to a stop condition behind the train and remains in the stop condition until the entire train is detected leaving the track section governed by the signal. The detection of the departure of an entire train from a track section causes the restoration of the control circuits for the signal governing the track section so that the signal can be controlled either automatically or manually to display a proceed aspect.

The use of train-carried and wayside apparatus to detect trains creates particular operational problems in the event of apparatus failures. If the cooperating apparatus for detecting the passage of the front of the train fails, signals would not be operated to display stop aspects behind the train, such being an unsafe condition. The failure of the cooperating apparatus for detecting the passage of the rear of the train would result in the continued displaying of stop aspects by signals in the rear of the train, such being a safe failure but acting to tie up the system. In consideration of the preceding conditions, the present invention provides means for checking the integrity of operation of the detection apparatus so that a signal is caused to display a stop aspect behind a train under all conditions wherein the front of a train is detected passing and under any conditions wherein the front of a train is not detected but the rear of the train is detected. In addition, the present invention provides means for indicating the failure of one or the other of the front and rear train detection apparatus so that authorized personnel can correct the condition to avert a resulting tie-up in the signaling system.

The train detection means provided in the present invention is adaptable for use either alone or in conjunction with track circuits. Since at the present time the number of special trains which are incapable of producing continuous effective shunts are few in number compare to the number of standard trains, it is proposed in the present invention that only such special trains be equipped with train-carried apparatus even though all trains could be so equipped. The number of trains to be equipped and the number of wayside detection points to be provided are economic matters which vary with the track layouts involved.

Since the type of cooperating train-carried and wayside apparatus employed can be either electrical or mechanical, or both, it can be desirable in the case of electrical apparatus to employ auxiliary mechanical apparatus for detecting trains in the event of a failure of the electrical apparatus. For this reason, the present invention discloses auxiliary electromechanical means which is normally disposed to be mechanically actuated by a train. The auxiliary detection means is electrically operable by the electrical detection means so that the auxiliary detection means is rendered inoperative except when failures occur in the electrical detection apparatus. In other words, a passing train normally causes particular operations of the electrical train detection means, and if such operations do not occur the auxiliary mechanical means is not rendered inoperative and will be mechanically actuated by the train.

In a railway signal system of the well-known absolute permissive block type, for example, trains are permitted to pass some signals (permissive signals) when such signals display stop aspects, provided that trains stop at such signals and then proceed at reduced speed prepared to stop when another train or an obstruction is seen. Under such circumstances, more than one train can occupy a track section at one time. Therefore, signaling operations resulting from operations of cooperating train-carried and wayside detection apparatus only must be such that a block signal cannot be rendered subject to clearing operations in response to the detected passage of only the first of a plurality of trains from the track section. If this were permitted, a signal could display a proceed aspect to permit a train to enter an occupied track section at normal speed. The present invention, therefore, provides means for detecting the passage of more than one train into a track section, and further provides means for controlling signals so that a signal cannot be cleared while the associated track section is occupied.

Since as previously stated, the number of special trains in current use are few compared to the number of standard trains, a block, or stretch of track, will be occupied by more than one special train only rarely, and will be occupied by more than two special trains under even rarer circumstances. The present invention, in one form, provides means for detecting each special train to enter a block and for automatically clearing the block signal when only one detected train enters and subsequently leaves the block; when more than one special train is detected entering the block the present invention provides means for the clearing of the block signal only by manually operable means which must be operated by authorized railroad personnel when the last special train leaves the block.

To provide for automatic signal clearing control in cases where a plurality of special trains occupy a block, or stretch of track, a modified form of the present invention provides means for counting the number of intact special trains entering a block and for counting the number of intact special trains leaving the block, and the entering and leaving counting operations determine whether or not a block signal can be operated to display a clear aspect. In conjunction with the counting means, the present invention also provides indication means to indicate the number of special trains occupying a block at any time. In this manner, both the operating personnel on such special trains and train dispatchers can be informed of the exact conditions which exist in an occupied permissive block.

On railroads which employ relatively few special trains it would be economically feasible to install wayside detection apparatus at only a few signal locations rather than at every signal location. In block signaling territory, for example, wayside detection apparatus can be installed at only those signal locations which are at the entrance to blocks. Any other signals (intermediate signals) in a block would not be provided with special detection apparatus. Where permissive block signals are used and one train can follow another into a block, it is desirable to provide means for controlling the intermediate signals in accordance with block occupancy conditions. The present invention, therefore, provides special control means for controlling such intermediate signals in advance of a special train which is detected entering a block. The indications displayed by such intermediate signals is indicative of the occupancy of the block by one or more special trains.

In track-circuited territories block signaling operations are automatic in response to the shunting of track circuits by standard trains. Therefore, the special controls for intermediate signals provided by the present invention should not conflict with standard signaling operations caused by standard trains. The present invention, therefore, includes signaling means for governing both standard and special trains under any conditions. In the case of intermediate signals, the present invention proposes the use of auxiliary marker signals which are controlled by operations of the cooperating train-carried and wayside detection apparatus at block entrance signal locations. The auxiliary signaling means acts to modify the aspects displayed by such intermediate signals so that operating rules can be easily incorporated to govern movements of both standard and special trains. Specifically, the present invention provides for standard control of intermediate signals by standard trains, and the aspects displayed by such signals are binding upon both standard and special trains. Special trains operate the auxiliary signaling means to display indications which are binding upon standard trains and are conditionally binding upon special trains, since such special trains control the auxiliary signaling means in advance. The control system is arranged so that the entrance of one special train into a block operates the auxiliary signals in the block but does not operate the intermediate signals in the block; the entrance of more than one special train into a block, however, operates both the auxiliary and the intermediate signals. In this manner, one special train is not restricted by intermediate signal aspects when modified by marker signals, but restrictions are put into effect upon the entrance of a second special train.

Since the present train detection circuits extend between successive signal locations, control information is normally assumed to be transmitted between locations by line wires. However, instead of line wires, track rails can be used for the transmission of train detection controls. In cases wherein track circuits are used in conjunction with special detection apparatus, the use of track rails for transmitting special train detection controls must not interfere with normal track circuit operations. Thus, the present invention provides track circuit means which is operable in response to train shunts and is also operable in accordance with operations of the special detection apparatus so that the track rails can be utilized for the transmission of such train detection controls.

In view of the preceding considerations, an object of the present invention is to provide a signaling system in which special trains incapable of reliably shunting track circuits are detected by the cooperation of wayside detection apparatus at each signal location and characteristically different train-carried apparatus mounted at the front and rear of each special train.

Another object of this invention is to provide a signaling system in which cooperating train-carried and wayside detection apparatus can be used either alone or in conjunction with standard track circuits which detect standard trains.

Another object of this invention is to provide a signaling system in which cooperating train-carried and wayside detection apparatus are electrical in character and in which circuit means are provided to insure safe system operations in the event of the failure of such electrical detection apparatus.

Another object of this invention is to provide auxiliary electromechanical wayside detection means to cooperate with electrical train-carried and wayside detection apparatus to insure safe system operations in the event of the failure of such electrical detection apparatus.

Another object of this invention is to provide signal control circuits operable in response to operations of cooperating train-carried and wayside detection apparatus to detect the number of trains occupying a particular stretch of track governed by a permissive signal and to distinctively control the signal in accordance with the number of trains occupying the block.

Another object of this invention is to provide signal control circuits operable in response to operations of cooperating train-carried and wayside detection apparatus for controlling intermediate signals in a permissive block in advance of the train in accordance with the number of trains occupying the block.

A further object of this invention is to provide a railway signaling system in which both detector track circuits and cooperating train-carried and wayside detection apparatus are used and in which track circuits are subject to conditioning by the detection apparatus so that the track rails can be used for the transmitting of train detection control information between signal locations.

Other objects, purposes and characteristic features of the present invention will be in part obvious from the accompanying drawings, and in part pointed out as the description of the invention progresses.

In describing the invention in detail, reference will be made to the accompanying drawings, in which like reference characters (provided with distinctive exponents) designate corresponding parts throughout the several views, and in which.

Figure 6:
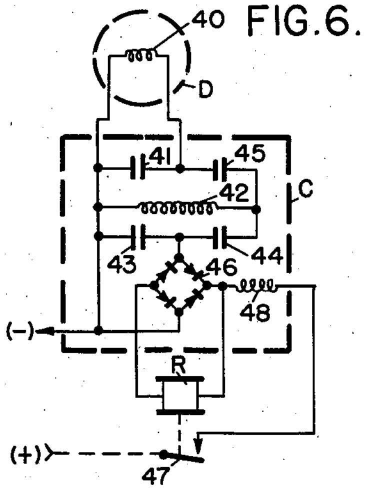
Figure 2:
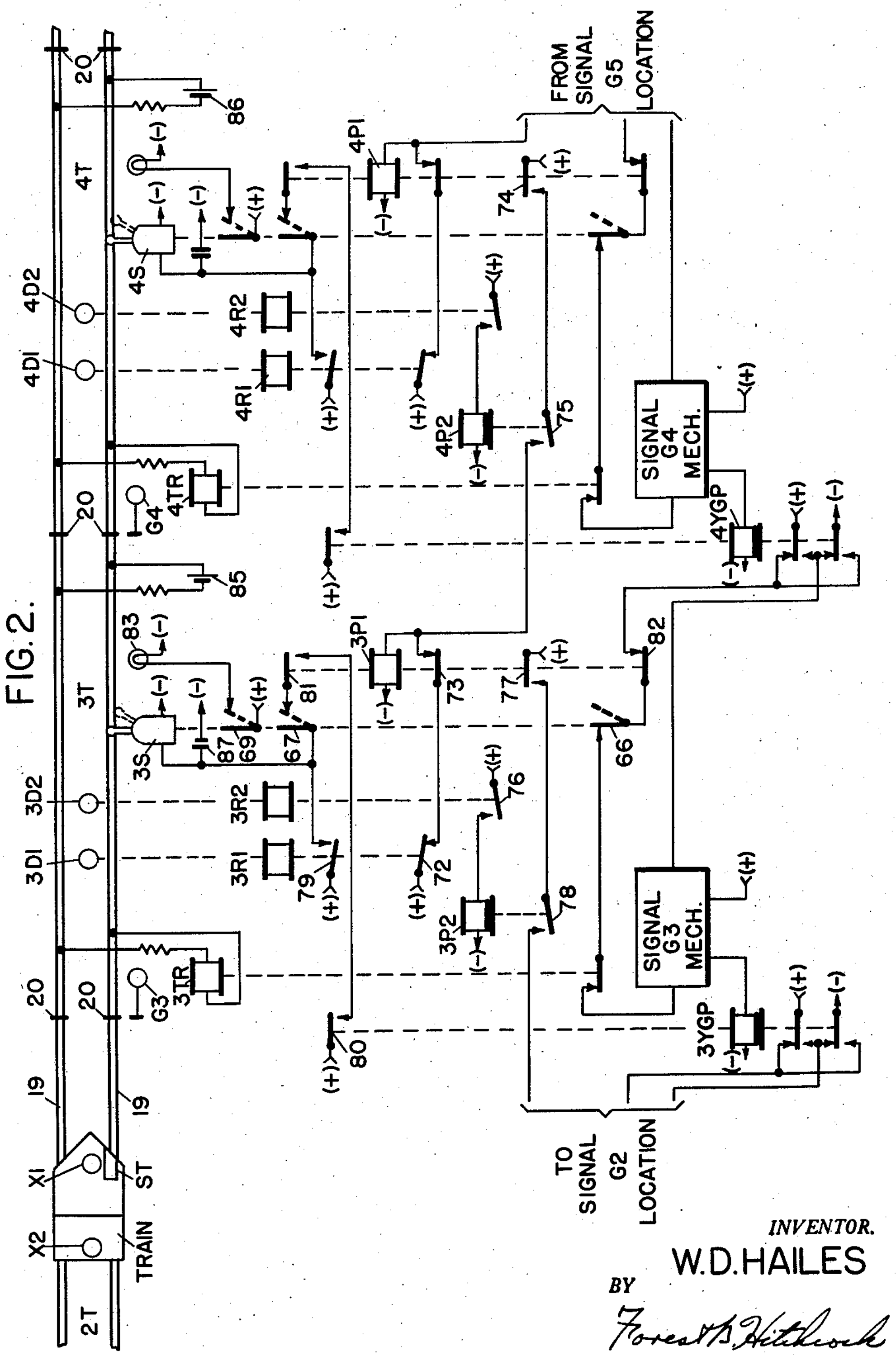
Fig. 2 shows diagrammatically a modified form of the special detection and signal control means of the present invention, including auxiliary electromechanical train detection means.
Figure 3A:
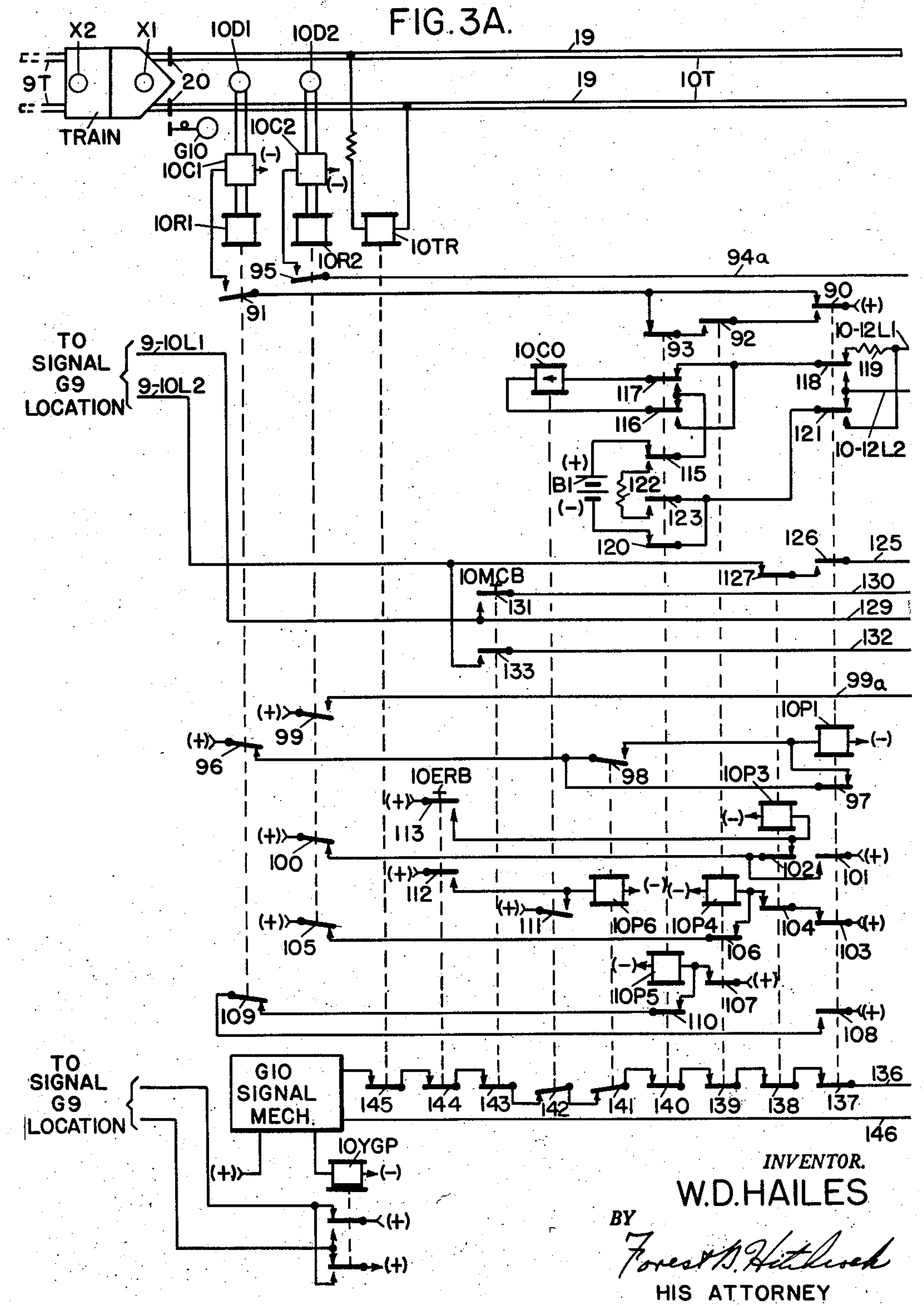
Figure 3B:
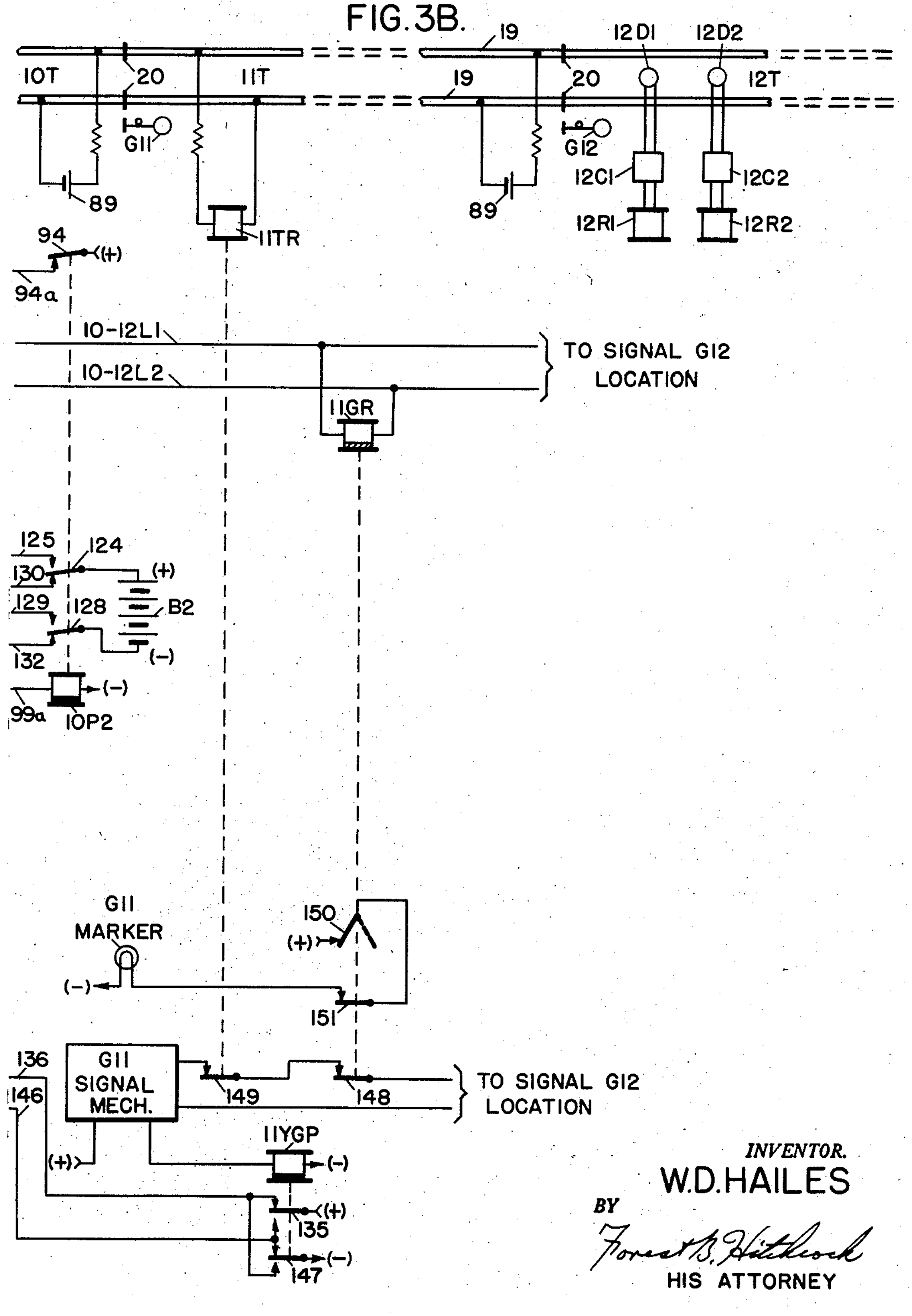
Figure 4A:
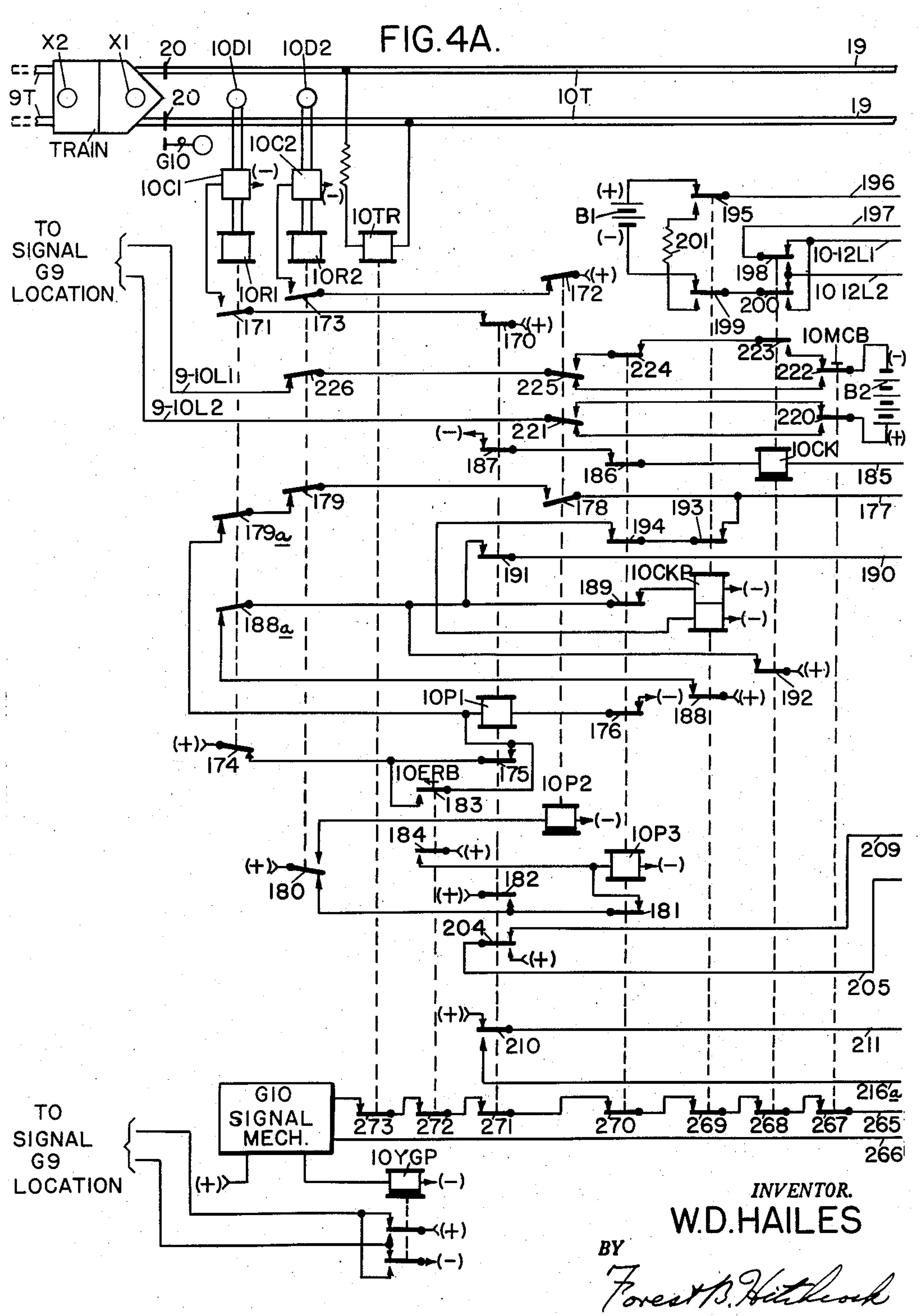
Figure 4B:
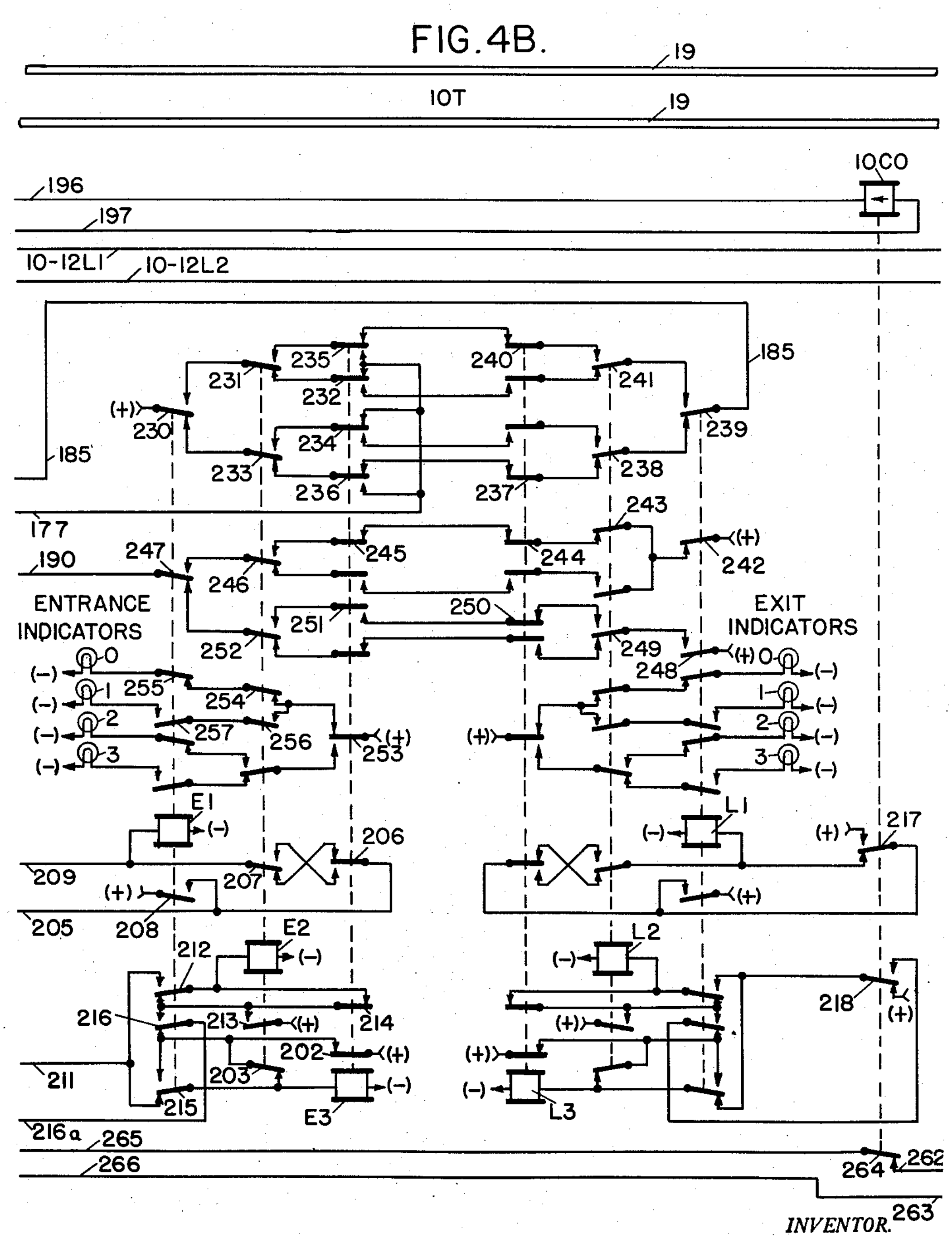
Figures 4C, 8:
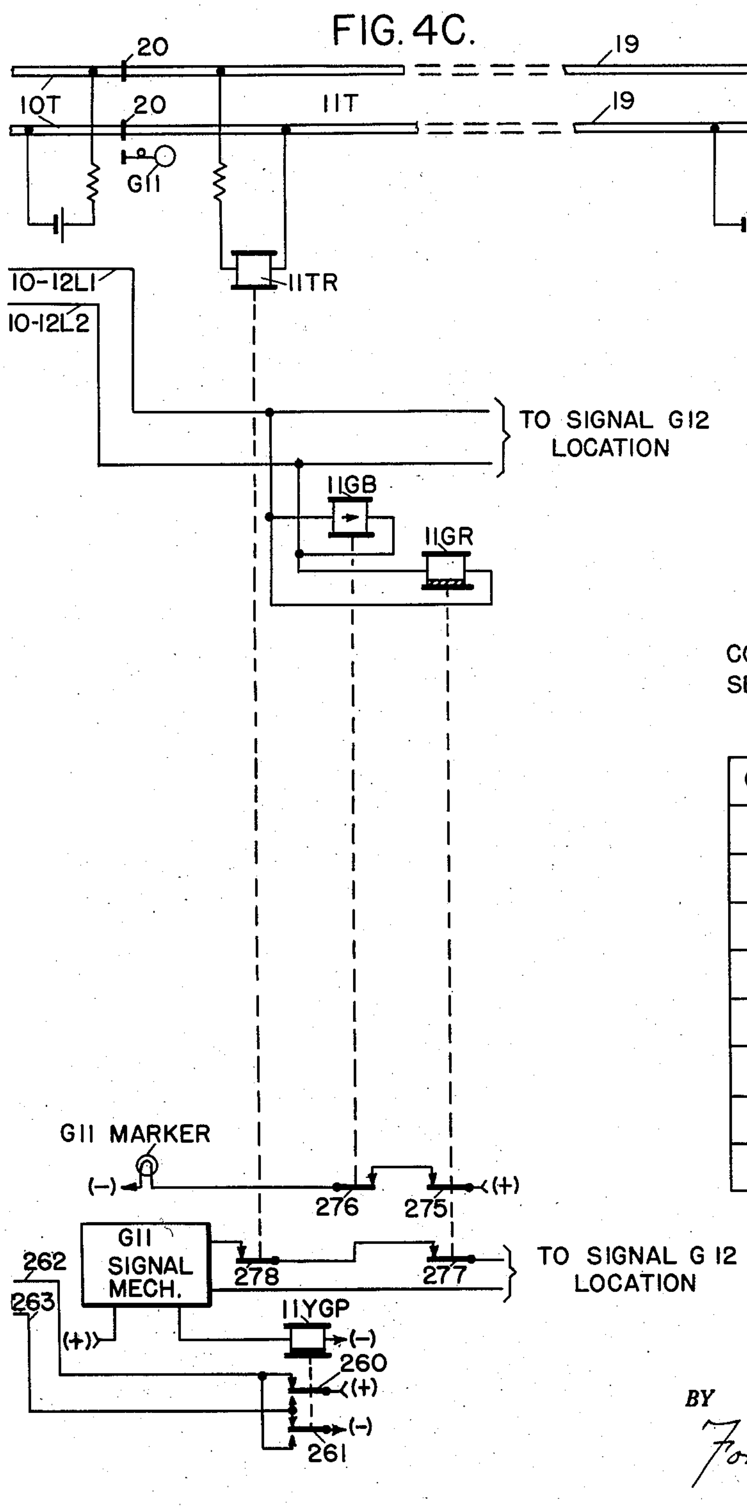
Figure 5:
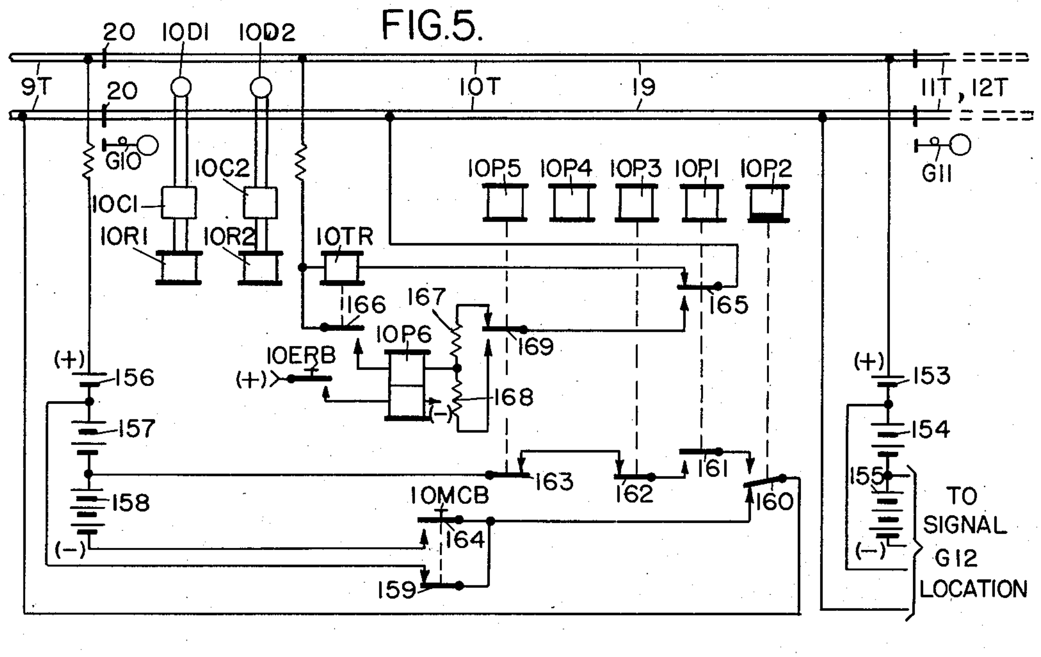
Figure 7:
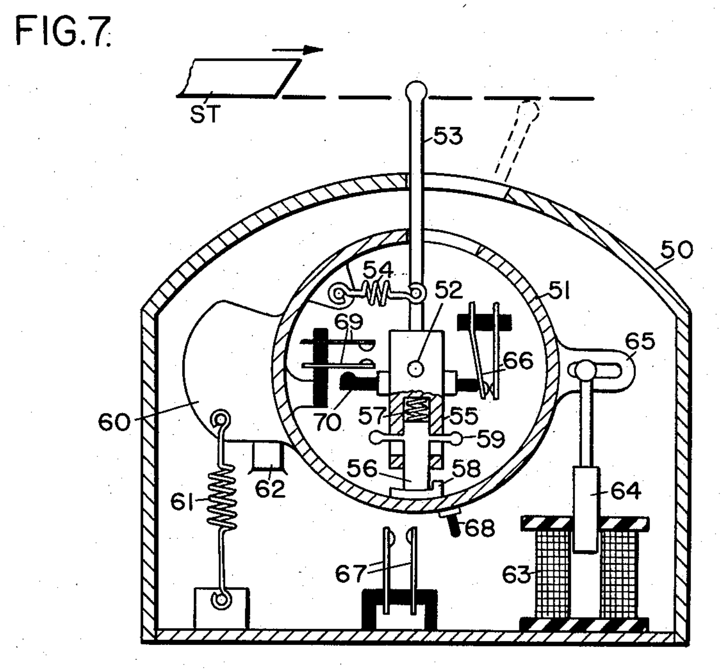

Figs. 3A and 3B when placed side by side, show diagrammatically another form of the special detection and signal control means of the present invention for controlling block signals and intermediate signals in permissive block territory;

Figs. 4A, 4B and 4C, when placed side by side, show diagrammatically another form of the detection and signal control means of the present invention for controlling block signals and intermediate signals under conditions of the occupancy of a block by more than one train;

Fig. 5 shows diagrammatically a modified form of the circuits of Fig. 3, in which the track rails are used to transmit train detection controls between signal locations;

Fig. 6 shows diagrammatically the detailed structure of a wayside receiver shown diagrammatically in Figs. 1–5;

Fig. 7 represents one form which the auxiliary electromechanical detection means of Fig. 2 can assume; and Fig. 8 is a sequence chart showing the sequence of operation of the various counting relays shown in Fig. 4.

For the purpose of simplifying the illustration and facilitating in the explanation, the various parts and circuits constituting the embodiment of the invention have been shown diagrammatically and certain conventional illustrations have been employed, the drawings having been made more with the purpose of making it easy to understand the principles and mode of operation, than with the idea of illustrating the specific construction and arrangement of parts that would be employed in practice. Thus, the various relays and their contacts are illustrated in a conventional manner, and symbols are used to indicate connections to the terminals of batteries, or other sources of electric current, instead of showing all of the wiring connections to these terminals.

The symbols (+) and (−) are employed to indicate the positive and negative terminals, respectively, of suitable batteries, or other sources of direct current; and the circuits with which these symbols are used always have current flowing in the same direction.

Figure 1:
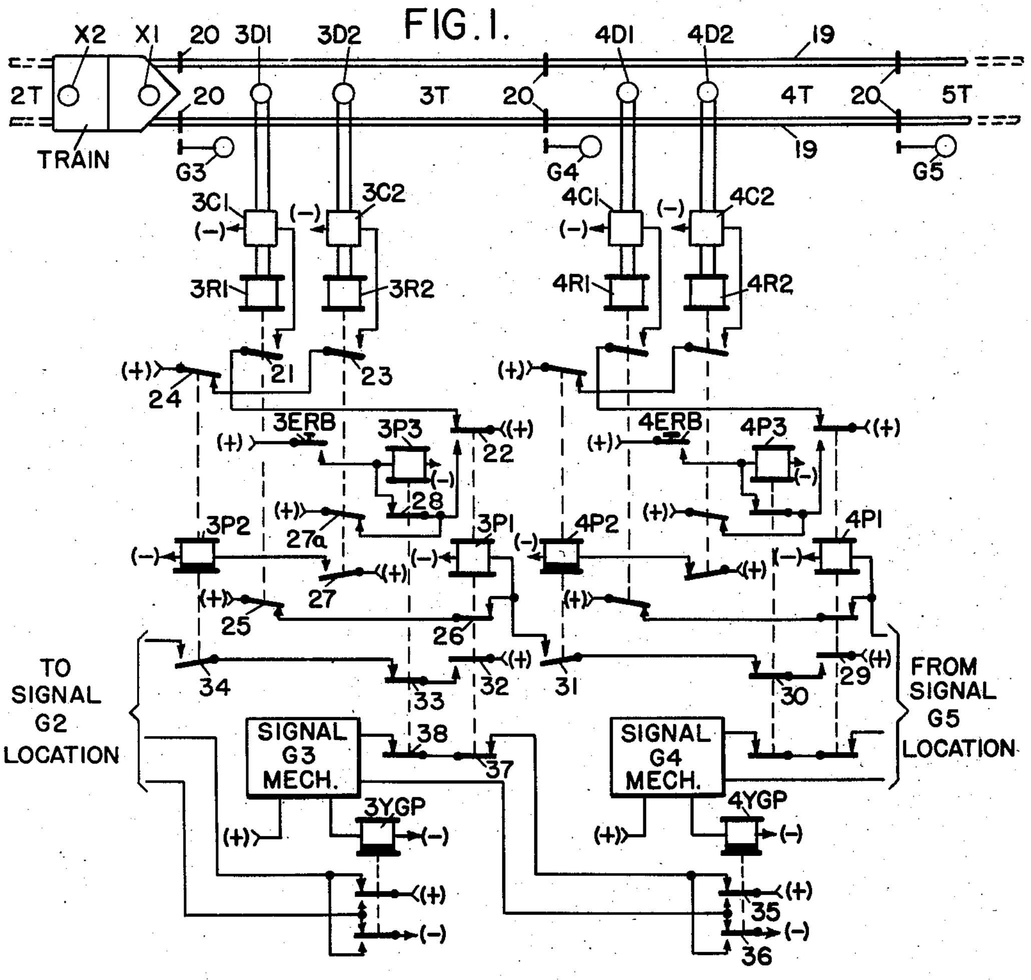
Fig. 1 shows diagrammatically a portion of a block signaling territory and further shows, in one form, the special detection and signal control circuit means embodied in the present invention.

*Fig. 1.—Apparatus and circuit operation*

The reference characters 19 designate the rails of a stretch of single track over which traffic is assumed, for simplicity, to travel in a single direction, from left to right. The stretch of track is divided into a plurality of track sections of which track sections 2T, 3T, 4T and 5T are shown either in part or in their entireties. At the entrance to each of the track sections a searchlight signal such as described in the U.S. Patent No. 2,037,650 to O. S. Field dated April 14, 1936, is located.

The stretch of track may or may not be provided with track circuits. In the event that such track circuits are provided, insulated rail joints 20 are indicated at the extremities of the various track sections. It will be assumed that special trains travelling over the stretch of track are incapable of effectively shunting detector track circuits and must be detected by the circuit means to be described.

A special train is shown occupying the track section 2T. Mounted at the front of the train is a check-in transmitter coil X1, and a check-out transmitter coil X2 is shown mounted at the rear of the train. The transmitters X1 and X2 are assumed to be of an electronic type and are capable of providing output signals of particular frequencies. Although the type of transmitter employed can be of a number of well-known types and can provide output energies of various characteristics, it will be assumed that the distinctive characteristic of such output energy is one of frequency. In order to differentiate between the front and rear of a train the output frequency of the transmitter X1 is assumed to be readily distinguishable from the output frequency of the transmitter X2.

A signal G3 is located at the entrance to the track section 3T, and similar signals G4 and G5 are located at the respective entrances to track sections 4T and 5T. Located near signal G3 are two wayside check-in and check-out detector coils 3D1 and 3D2 respectively which are disposed to cooperate, respectively, with the train-carried transmitters X1 and X2. The detectors 3D1 and 3D2 can assume the form of wayside inductors in which electromotive forces are induced by the output energies of the train-carried transmitters whenever the transmitters and detectors are in proximity during the passage of a train.

The detectors 3D1 and 3D2 are connected to and tuned by wayside circuits designated by the reference characters 3C1 and 3C2. The tuned detectors and the tuned wayside circuits are capable of distinguishing between energies having the respective output frequencies of the train-carried transmitters X1 and X2. Therefore, the wayside detection circuit means comprising the tuned detector 3D1 and the tuned circuit of 3C1 are capable of detecting the front of the train, while the rear of the train is detected by tuned detector 3D2 and the associated tuned circuit of 3C2. A more detailed description of the wayside detectors and tuned circuits will be given later with reference to Fig. 6.

Associated with the tuned circuits 3C1 and 3C2 are entrance detection relays 3R1 and 3R2. It is assumed that relay 3R1 is energized when the associated wayside detection circuits are activated upon the passage of the front of the train. Similarly, relay 3R2 is energized upon the passage of the rear of the train. Since the train-carried and wayside apparatus may be in proximity for only a brief interval, dependent upon the speed of a train, it is essential that relays 3R1 and 3R2 be held energized by circuit means for a period long enough to permit the operation of other circuits to be described. Therefore, a stick circuit for relay 3R1 is provided through a contact 21 of relay 3R1 and a front contact 22 of a repeater relay 3P1. Similarly, a stick circuit for relay 3R2 includes front contact 23 of relay 3R2 and back contact 24 of a repeater relay 3P2. It can be assumed for the moment that the respective stick circuits are capable of acting through the tuned circuits 3C1 and 3C2 to maintain energization of the respective detection relays.

Three repeater relays 3P1, 3P2 and 3P3 are provided at the signal G3 location for operating signal G3 in response to the detection of a train. Similar repeater relays 4P1, 4P2 and 4P3 are provided at signal G4 location to provide similar circuit operations in response to the operation of similar wayside detection apparatus comprising detectors 4D1 and 4D2, tuned circuits 4C1 and 4C2, and detection relays 4R1 and 4R2. The repeater relay 3P1 is an entrance repeater relay and is normally energized by a stick circuit including back contact 25 of relay 3R1 and front contact 26 of relay 3P1. Relay 3P2 is an exit repeater relay and can be energized by a circuit including front contact 27 of relay 3R2. Relay 3P2 is slow-acting in releasing its armature for reasons to be described. Relay 3P3 is a detection check relay which is normally energized by a stick circuit including front contact 28 of relay 3P3 and either back contact 27a of relay 3R2 or back contact 22 of relay 3P1. In addition to the circuits described, a pick-up circuit is provided for relay 3P1 which includes back contact 29 of relay 4P1, front contact 30 of relay 4P3, and front contact 31 of relay 4P2, and relay 3P3 can be energized by a pick-up circuit including a contact of an emergency release button 3ERB.

It can be seen by inspection that the circuits provided in association with signal G4 location are identical to those shown associated with signal G3 location, and all other signal locations are assumed to have identical associated circuits. Similar to the described pick-up circuit for relay 3P1 is a pick-up circuit for a relay 2P1 (not shown) including back contact 32 of relay 3P1, front contact 33 of relay 3P3, and front contact 34 of relay 3P2.

Signal G3, as previously noted, is assumed to be of the searchlight type, and is further assumed to be of the type described in the U.S. Patent No. 2,037,650 to O. S. Field dated April 14, 1936. Relying on this patent for a complete disclosure of signal operation, it can be stated here that the signal mechanism is of a three-position type in which operations of the mechanism are in response to polarized energizations. Specifically, when deenergized the mechanism assumes a mechanically biased normal position and displays a red aspect. When energized by energy of one polarity, the mechanism is operated to a second operating position, and a yellow aspect is displayed by the signal. Energization of the mechanism by energy of the opposite polarity results in the operation of the signal mechanism to its third operating position resulting in the displaying of a green aspect. A control circuit for the mechanism of signal G3 is shown to include contacts 35 and 36 of a repeater relay 4YGP which is associated with signal G4, and contacts 37 and 38 of relays 3P1 and 3P3 respectively.

The signal mechanisms are assumed to have electrical contacts which are operated to positions which correspond to the operating positions of the mechanism. To repeat the yellow and green positions of the mechanisms, yellow-green repeater relays are provided. In the drawing, relays 3YGP and 4YGP are the yellow-green repeater relays for signals G3 and G4. These relays are slow acting in releasing their armatures so that they will retain their armatures during signal operations which comprise changing from yellow to green aspects, or conversely.

It is evident from the description of the operating circuits for the signal mechanisms that the signals are controlled to display aspects in accordance with the condition of the associated detection repeater relays and the condition of the next YGP relay in advance. In the case of signal G3, the signal can be energized to display a proceed aspect only if relays 3P1 and 3P3 are both energized closing their respective front contacts 37 and 38.

The operation of the system when the train enters the track section 3T begins with the excitation of the receiver 3D1 and the tuned circuit 3C1 by the train-carried transmitter XI. Relay 3R1 picks up in response to the operation of the detection circuits and opens its back contact 25 in the previously described stick circuit for relay 3P1, causing that relay to release its armature. The closing of front contact 21 of relay 3R1 closes the stick circuit for relay 3R1, and this stick circuit remains closed until front contact 22 of relay 3P1 opens. In this manner, the detection of the passage of the front of the train results in the energization of the entrance detection relay 3R1 which causes the deenergization of the entrance repeater relay 3P1; and relay 3R1 is held energized by its stick circuit until a positive deenergization of relay 3P1 occurs.

When the rear of a train passes the detection apparatus at signal G3 location, the train carried transmitter X2 excites the wayside detector 3D2 and the associated tuned circuit 3C2, causing the energization of the exit detection relay 3R2. Relay 3R2 closes its front contact 23 to provide stick energy for the relay, and at the same time, closes front contact 27 to energize the exit repeater relay 3P2. The subsequent opening of back contact 24 of relay 3P2 opens the stick circuit for relay 3R2.

The detection repeater relay 3P3 is assumed to be released only when the passage of a train results in the operation of relay 3P2 without the previous release of relay 3P1. In other words, the front of the train was not detected, but the rear of the train was detected. Therefore, to avoid the release of relay 3P3, the passage of a train must result in the deenergization of relay 3P1 which closes its back contact 22 to provide energization for relay 3P3, otherwise the subsequent actuation of relay 3R2 by the rear of the train would cause the deenergization of relay 3P3 by the opening of back contact 27*a* of relay 3R2.

Under normal conditions, whenever relay 3P1 is deenergized, it can be reenergized only when its pick-up circuit is closed by the operation of relays 4P1 and 4P2 at the next signal location in advance.

Thus, when the front of a train is detected entering track section 3T relay 3P1 is deenergized causing the operation of signal G3 to display a stop aspect. Relay 3P1 will continue to be deenergized, holding signal G3 at stop, until the pick-up circuit for relay 3P1 is closed upon the detected passage of the entire train at signal G4 location.

Assuming that similar operations occurred at the preceding signal G2 location upon the passage of the train, a comparable relay 2P1 (not shown) is energized when both the front and the rear of the train have been detected passing signal G3 location. In other words, the passage of the train results in the deenergization of relay 3P1 and, later, in the energization of relay 3P2, thereby closing a pick-up circuit for relay 2P1. It can be noted here that such a pick-up circuit is closed only during the slow-release time of relay 3P2, and it is for this reason that relay 3P2 is made slow-acting. Specifically, relay 3P2 is energized only briefly during the momentary energization of relay 3R2 as the rear of the train passes, and since sufficient time is required for the operation of the circuits at signal G2 location to the rear of signal G3, slow-acting characteristics must be given to relay 3P2.

The previously described operation assumes that both the front and the rear of the train were detected passing signal G3 location. Under all conditions, it is essential that signal G3 be put to stop when the front of the train is detected entering track section 3T. It is further necessary that signal G3 be held at stop until the entire train passes the next signal location in advance, thereby indicating the vacating of track section 3T by the train. If the front of the train fails to be detected at a signal location, safety considerations require that signals to the rear be held at stop. For this reason, a back contact of the normally energized P1 relay at each location is included in the pick-up circuit for the P1 relay at the preceding location.

It is further essential that the rear of a train be detected passing each signal location before signals to the rear can be permitted to display proceed aspects; otherwise, it would be possible for part of a train to be left occupying a track section even though the front of the train had checked in at the next signal location.

The failure of the rear of the train to be detected is essentially a safe failure because if the exit repeater relay P2 at a signal location is not operated by a passing train, the pick up circuit for the entrance repeater relay P1 at the preceding location is never closed; and the deenergized state of an entrance repeater relay P1 prevents the operating of the associated signal to display a proceed aspect. However, it is necessary to provide check means to preclude the possibility of a signal failing to be operated to display a stop aspect behind a train in the event that the front of the train is not detected. In other words, if the front of the train fails to operate relay 3P1, signal G3 is not put to stop after the front of the train passes. If this condition prevailed, a subsequent train which proceeded at restricted speed past a red signal aspect at signal G2 location would be governed by a green signal aspect at the entrance to the already occupied track section 3T. For this reason, relay 3P3 is provided to detect conditions under which only the rear of the train is detected. If both the front and rear of the train are detected, relay 3P3 remains energized throughout. However, if relay 3P1 is not operated to close its back contact 22, the operation at relay 3R2 to open its back contact 27*a* in response to the passage of the rear of the train results in the deenergization of relay 3P3. Thus, signal G3 is put to stop by operations of either relay 3P1 or 3P3.

If an apparatus failure occurs resulting in the detection of only the rear of the train, the signal will continue to display a stop aspect until relay 3P3 is restored by the manual operation of the emergency release button 3ERB by authorized persons. In actual practice the restoration of the circuits by a member of a train stopped at signal G3 must be effected under the direction of a central dispatcher who is aware of traffic conditions.

Referring to Fig. 6, a more detailed showing of the wayside detectors and tuned circuits is shown. The detector D is shown to consist of a receiving winding or inductor 40 which is connected in parallel with a capacitor 41. The combination of the inductor 40 and capacitor 41 forms a tuned circuit which is tuned to the frequency of the particular train-carried transmitter to be detected.

A second tuned circuit comprising an inductor 42 and capacitors 43 and 44 is provided, and is connected to the previously described tuned circuit through a coupling capacitor 45.

The output of the tuned circuit arrangement is applied to the detection relay R through a full-wave rectifier 46.

The described circuits are of a standard type and are arranged to be tuned to a particular frequency, and are further arranged to provide a maximum power transfer to the relay R in a manner such that the selectivity of the circuits is not altered. The problem encountered here is one of design and varies in accordance with the circuit constants encountered, such design being well within the ability of one skilled in the art.

Since the tuned circuits may be activated only briefly during the passage of a train-carried transmitter, stick circuit means for the associated detection relay are provided as previously described. The stick circuit arrangement as indicated here includes a front contact 47 of the relay R and an inductor 48 which are connected in series and to one terminal of the rectifier 46. Negative D.C. energy for the stick circuit is shown connected to another terminal of the rectifier 46. The purpose of the inductor 48 in the stick circuit for relay R is to preclude the effective shunting of the input to the rectifier. Specifically, when front contact 47 of relay R closes a circuit can be traced from the junction of capacitors 43 and 44 through the upper right leg of the rectifier, the inductor 48, contact 47 of relay R, the source of direct current stick energy, to the left terminal of capacitor 43. This circuit is in parallel with the input to the rectifier. When contact 47 of relay R closes it makes no difference, normally, whether or not the rectifier input is shunted because relay R is held by stick energy. If, however, contact 47 should bounce upon closing the stick energy is interrupted while the pulsating rectifier input energy can bridge the open circuit created during the contact bounce. Thus, the input or pick-up circuit for relay R can be shunted, and relay R could be released, this being especially true during the passage of a fast train whereby the tuned circuits are activated only briefly. The possible shunting circuit can be rendered ineffective by the inductor 48 which is assumed to have sufficient inductance to provide a high impedance to pulsating rectified direct current energy of the frequency to be detected by the tuned circuits. In this manner, relay R is rendered fully responsive to pick-up energy until its stick circuit is positively closed.

*Fig. 2.—Apparatus and circuit operation*

In Fig. 2, a stretch of track identical to that in Fig. 1 is shown, the track rails and insulated joints being designated by the reference characters 19 and 20.

In Fig. 2, however, it can be seen that in addition to the wayside detection apparatus standard track circuits are shown. As before, the detection apparatus is assumed to comprise wayside receivers 3D1, 3D2, 4D1 and 4D2 which act in cooperation with tuned circuits (not shown) to operate detection relays 3R1, 3R2, 4R1 and 4R2.

Detection repeater relays 3P1 and 3P2 are again provided in association with the track section 3T, and relays 4P1 and 4P2 are shown associated with the track section 4T. It can be seen that the detection repeater relays 3P3 and 4P3 shown in Fig. 1 are not included in the circuit arrangement in Fig. 2. The function of the detection repeater relays, as previously described, was to insure that a signal would be operated to display a stop aspect in the event that the rear of a train was detected but the front of a train failed to be detected. This function is essentially duplicated in Fig. 2 by electromechanical detection devices such as 3S and 4S.

Before describing the operation of the circuits in Fig. 2, reference is made to Fig. 7 which shows one from which an electromechanical wayside detection device can assume.

The electromechanical detection device is assumed to comprise a case 50 which is mounted by suitable means adjacent to the track. A drum 51 is pivotally mounted within the housing 50 and is free to rotate about a pivot 52. An arm 53 is independently pivoted about the pivot 52 and extends through openings provided in the drum 51 and the housing 50. The arm 53 is retained in a normal position relative to the drum 51 by a spring 54 which interconnects the arm and the drum. The base 55 of the arm structure is hollow to accommodate a latch 56 and a spring 57. The latch 56 rests on a projection 58 on the inner surface of the drum 51. Whenever the arm 53 is rotated relative to the drum 51, the latch 56 slides over the left extremity of the projection 58 and is forced downward by the spring 57. Under such conditions, the arm is locked in its displaced position (broken lines) until the latch 56 is moved upward manually using the projecting arms 59 which are parts of the latch.

When the arm structure 53 is in its normal position relative to the drum 51, it can also be displaced in response to rotational displacements of the drum. The drum 51 is biased to a normal position by a counterweight 60 and a spring 61. The spring 61 is attached to both the counterweight 60 and the case 50. A stop 62 prevents counterclockwise rotations of the drum past its normal position.

In order to operate the drum 51 to its operating position, a solenoid 63 is provided. The solenoid plunger 64 is pivotally connected to an ear 65 on the drum assembly. Whenever the solenoid is energized, the plunger 64 is drawn downward causing a clockwise rotation of the drum and the arm 53.

The displaced position of the arm 53 shown by broken lines can be attained either by a rotation of the drum or by a rotation of the arm assembly relative to the drum.

It is assumed that each special train includes a special structure ST which is capable of engaging the arm 53 whenever the arm is extended in the path of the train. The basic mode of operation of the electromechanical device is, therefore, that the arm 53 is normally extended in the path of a train, and if the train fails to operate the solenoid 63 to rotate the drum 51 the arm 53 is subject to mechanical actuation by the train.

The electromechanical device includes pluralities of contact springs which are operated by particular movements of the arm 53 and the drum 51. The contact springs 66 are closed by a projection on the arm assembly whenever the arm is in its normal position. Contacts 66 are assumed to be attached to the case 50. Contact springs 67 which are also attached to the case assembly can be actuated to close by a projection 68 on the drum 51, and these contacts are closed only when the drum is rotated by the solenoid 63. A third set of contacts 69 are shown attached to the drum 51 and are subject to actuation by an actuator 70 which is attached to the arm structure. The contacts 69, therefore, are closed only when the arm 53 is displaced relative to the drum 51. In general, the various types of contacts shown are operable to define particular operating conditions of the arm 53 and/or the drum 51.

Referring again to Fig. 2, the entrance repeater relay 3P1 is normally energized by a stick circuit including back contact 72 of the entrance detection relay 3R1 and front contact 73 of relay 3P1. Relay 3P1 also has, as before, a pick-up circuit which includes back contact 74 of relay 4P1 and front contact 75 of relay 4P2.

The exit relay 3P2 is energized whenever front contact 76 of the exit detection relay 3R2 closes. As before, relay 3P2 is of the slow-release type to provide sufficient time for the operation of circuits at the preceding signal location.

A pick-up circuit for an entrance repeater relay 2P1 (not shown) at the preceding signal G2 location is indicated. This pick-up circuit includes back contact 77 of relay 3P1 and front contact 78 of relay 3P2.

The electromechanical detection device 3S is shown in its normal position in which the associated arm is extended toward the track. The train is shown carrying a special structural member ST in addition to the front and rear transmitters X1 and X2. The structure ST is located on a special non-shunting train so that it is capable of mechanically actuating the projecting arm of the electromechanical device 3S (and 4S).

The electromechanical device 3S can be actuated by the energization of its solenoid by a circuit including front contact 79 of relay 3R1. A second energizing circuit includes back contact 80 of the signal repeater relay 3YGP, back contact 81 of relay 3P1, contact 67 of the device 3S, and the winding of the solenoid.

The operation of the circuits associated with track section 3T upon the passage of a train will now be described. When the front train carried transmitter X1 is in proximity with the detector 3D1, relay 3R1 is energized. Back contact 72 of relay 3R1 opens to deenergize the repeater relay 3P1. Subsequently, front contact 79 of relay 3R1 closes to energize the solenoid in the electromechanical device 3S. The energization of the solenoid causes the rotation of the mechanism arm to the position indicated by broken lines, and in this position the arm is removed from the path of the structure ST on the train. It should be noted that the wayside detector 3D1 is located in advance of the electromechanical device 3S so that electrical train entrance detection is effected first, if at all. If such entrance detection is not effected, the electromechanical device 3S is not actuated electrically and is disposed so that its component arm remains in the path of the train.

Assuming that train entrance detection is effected electrically, the signal G3 is controlled to display a stop aspect by the deenergization of relay 3P1 which opens its front contact 82 in an obvious control circuit for the signal G3 mechanism.

When the rear of the train passes over the wayside detector 3D2, relay 3R2 is energized, closing its front contact 76 to pick up relay 3P2. At this time, back contact 77 of relay 3P1 and front contact 78 of relay 3P2 are both closed to establish a pick-up circuit for the entrance repeater relay 2P1 (not shown) at signal G2 location.

The described circuit conditions prevail until the train is detected passing signal G4 location. At that time, proper actuation of the wayside detection circuits at signal G4 location will result in the closing of the pick-up circuit for relay 3P1 by contacts 74 and 75 of relays 4P1 and 4P2, respectively. Under these conditions, the circuits associated with track section 3T and signal G3 are restored to normal.

When the entrance of a train is detected electrically, the electromechanical device 3S is electrically operated by closing of front contact 79 of relay 3R1. Since this operation occurs substantially before the train arrives at the location of the electromechanical device 3S it is essential that the device retain its actuated position until the train passes or, more specifically, until the special structure ST on the train passes. For this reason, the other energizing circuit for the device 3S including back contact 80 of relay 3YGP, back contact 81 of relay 3P1 and contact 67 of the device 3S is provided. This circuit is, in effect, a stick circuit which is effective as long as the signal G3 is at stop and the entrance repeater relay 3P1 is deenergized. In order to provide sufficient time for the electromechanical device 3S to operate and close its contact 67 a capacitor 87 is provided. This capacitor is charged during the energizing of the solenoid in the mechanism 3S and can discharge through the solenoid windings to provide sufficient sustaining energy.

The control circuit for signal G3 also includes contact 66 of the device 3S. This contact, as shown in Fig. 7, is closed only when the mechanism arm is in its normal position. Furthermore, as previously described, contact 66 can be opened in response to either electrical or mechanical actuations of the device 3S.

If a train is not detected by the entrance detection circuits the device 3S is mechanically actuated by the train. As described with reference to Fig. 7, under such conditions the mechanism arm is rotated relative to the operating drum and is locked in place by the action of its latch assembly. The arm thereby remains displaced until restored by manual means. Since mechanical actuations of the arm result in the opening of contact 66 of the device 3S, signal G3 will be caused to display a stop aspect until manual restoration of the mechanism is effected. It should be noted that the spring 54 shown in Fig. 7 is assumed to be weak so that a mechanical displacement of the arm 53 by a train does not cause a rotation of the drum 51.

Whenever a detection device is actuated mechanically, it is desirable to provide some sort of indication to inform the crews of following trains that an undetected train has passed the location previously. In this manner, a system tieup can be averted by authorizing railway personnel to reset the electromechanical wayside device to restore the signal control circuits to normal. To provide an indication, a wayside lamp 83 is shown associated with the mechanism 3S. This lamp can be located on the mechanism structure or can assume the form of a wayside marker signal. The lamp 83 is normally dark and can be energized by contact 69 of the device 3S. As previously disclosed with reference to Fig. 7, contact 69 of the device 3S is closed only when the operating arm is mechanically displaced relative to the electrically operated drum structure.

A principle involved in Fig. 2 is that it may be desirable to provide positive detection means which is subject to physical actuation by a passing train. Since mechanical devices create a problem in maintenance, especially when such devices are actuated frequently, the device disclosed is controlled in a manner such that mechanical actuation takes place only in emergencies and not as a rule.

In order to show the compatibility between detector track circuits and the wayside detection circuits of the present invention, the track sections 3T and 4T are shown having obvious detector track circuits which include track batteries 85 and 86 in conjunction with track relays 3TR and 4TR. Front contacts of the track relays are included, as in normal practice, in the various signal control circuits so that the shunting of a track relay results in the operation of a signal to display a stop aspect. No attempt has been made here to show signal control circuits which are more complex than those normally encountered in block signaling systems for single direction running, although it should be evident that the principles described herein are applicable to signaling systems which include approach locking, directional stick circuit means, and other standard signaling circuits.

*Figs. 3A and 3B.—Apparatus and circuit operation*

The control circuits described for Figs. 1 and 2 dealt primarily with controlling signals associated with track sections which would normally be occupied by only a single train at any time. The circuits in Figs. 3A and 3B, however, are arranged to provide for the detection of more than one train entering a particular track section, or block, and for controlling signals in accordance with conditions of track occupancy.

The reference characters 19 again designate the rails of a stretch of track which is divided into a plurality of track sections such as 9T, 10T, 11T and 12T. The rails of the various track sections are insulated from each other by insulated joints 20 which are necessary only when track circuits are employed, and obvious track circuits are shown including batteries 89 and relays such as 10TR and 11TR. Searchlight signals G10, G11 and G12 are shown at the respective entrances to track sections 10T, 11T and 12T; these signals are again assumed to be of the type disclosed in the previously cited Field patent.

Complete detection circuit means are shown for the track section 10T only and it is assumed that such circuits are provided at each of the signal locations corresponding to the signal G10 location. It is further assumed that signals G10 and G12 are block entrance signals which are provided at the entrance to a stretch of track, or block, which may include a plurality of track sections and a plurality of intermediate signals such as G11.

The stretch of track shown is assumed to be part of an absolute permissive block signaling territory wherein trains are permitted to pass permissive signals regardless of the signal aspect as long as trains stop when required and then proceed at restricted speeds.

The signals G10, G11 and G12 are assumed to be controlled by track circuit operation as well as by the present detection circuit means. The aspect displayed by any signal is governed not only by track occupancy conditions but also by the condition of the next signal in advance, this being in accordance with well-known signaling practices.

As previously stated, economic considerations can preclude the installations of electronic train detection means at each and every signal location. The present drawings, therefore, show such apparatus at only block entrance signal locations. Since the intermediate signal locations such as G11 are not equipped with detection apparatus, the present circuits provide means for controlling such signals in advance of a train. In order to provide distinctive intermediate signal aspects for governing both shunting and non-shunting trains, marker signals are provided to act in conjunction with respective intermediate signals to modify the signal aspects in accordance with the type of trains causing signalling operations.

As before, a train is shown carrying front and rear transmitters X1 and X2. The signal G10 location, wayside detectors 10D1 and 10D2 are provided, along with associated tuned circuits 10C1 and 10C2, for operating entrance and exit detection relays 10R1 and 10R2.

Stick circuit means is provided for maintaining the energization of relay 10R1, and this stick circuit includes either front contact 90 of a repeater relay 10P1 and front contact 91 of relay 10R1, or back contact 90 of relay

10P1, back contact 92 of repeater relay 10P4, front contact 93 of repeater relay 10P5 and front contact 91 of relay 10R1. A comparable stick circuit for relay 10R2 includes back contact 94 of relay 10P2, wire **94*a* and front contact 95 of relay 10R2. Repeater relays 10P1, 10P2 and 10P3 are identical to those previously described in Figs. 1 and 2. Relay 10P1 is an entrance repeater relay, relay 10P2 is an exit repeater relay, and relay 10P3 is a detection repeater relay for detecting the response of the detection apparatus to both the front and the rear of a train. Relay 10P1 is normally energized by a stick circuit including back contact 96 of relay 10R1 and front contact 97 of relay 10P1. A pick-up circuit for relay 10P1 includes back contact 96 of relay 10R1 and a front contact 98 of a repeater relay 10P6. Relay 10P2 has only a pick-up circuit which includes front contact 99 of relay 10R2 and wire 99*a*. Relay 10P3 is normally energized by a stick circuit including either back contact 100 of relay 10R2 or back contact 101 of relay 10P1, and front contact 102 of relay 10P3**.

Relays 10P1 and 10P2 and 10P3 are operable to register the entering and leaving of only one train, even though these relays respond to the passage of each and every train. If signaling operations are to be operable to detect a number of passing trains, additional repeater relays must be provided. For the circuits shown here, it will be assumed that a maximum of two special trains will normally be permitted to occupy the stretch of track between signals G10 and G12. Relays 10P4 and 10P5 are multiple entrance detection relays and are provided to register the entrance of a second train into track section 10T before a previous first train is detected leaving the track section 11T. Relay 10P4 is normally energized by a pick-up circuit including front contact 103 of relay 10P1 and front contact 104 of relay 10P3; and relay 10P4 is also energized by a stick circuit including back contact 105 of relay 10R2 and front contact 106 of relay 10P4. Relay 10P5 is normally energized by a pick-up circuit including front contact 107 of relay 10P4, and relay 10P5 can be energized also by a stick circuit including back contact 108 of relay 10P1, back contact 109 of relay 10R1, and front contact 110 of relay 10P5.

The operation of the various repeater relays is such that when the front of a train is detected by the wayside detection apparatus, relay 10R1 is energized opening its back contact 96 to deenergize relay 10P1. Relay 10P1 will then remain deenergized until its pick-up circuit can be closed by front contact 98 of relay 10P6, the function of which will be described later. When the rear of a train is detected passing signal G10, relay 10R2 is energized, closing its front contact 99 to energize the exit repeater relay 10P2. The operation of relay 10P3 is comparable to that described for previous P3 relays in that its stick circuit must be closed by the deenergization of relay 10P1 and the subsequent closing of back contact 101 of relay 10P1 before the stick circuit for relay 10P3 is opened by back contact 100 of relay 10R2 upon the detected passage of the rear of a train.

When one train is detected passing signal G10 location, relay 10P4 is deenergized by the successive openings of both its pick-up and stick circuits. The pick-up circuit is opened first at front contact 103 of relay 10P1, and the stick circuit is opened later by the opening of back contact 105 of relay 10R2 as the rear of the train is detected passing. If a second train then enters track section 10T while the circuits are in the described operated condition, relay 10P5 is deenergized by a series of operations. The deenergization of relay 10P4 causes the opening of the pick-up circuit for relay 10P5 at front contact 107 of relay 10P4. The detection of the passage of the front of the second train causes the opening of the stick circuit for relay 10P5 at back contact 109 of relay 10R1.

The effect of the operations of the various repeater relays will be described after consideration is given to the signal control circuits and to restoration circuits including line wires which connect successive block entrance signal locations.

The signal G10 location includes a repeater relay 10P6 and a check-out relay 10CO. Relay 10P6 is a restoration relay which, when operated, permits the restoration of the various repeater relay circuits. Relay 10P6 is provided with two pick-up circuits, one of which includes front contact 111 of the check-out relay 10CO, and the other pick-up circuit for relay 10P6 includes contact 112 of an emergency release button 10ERB which will be described later. Another contact 113 of the button ERB is also provided to energize relay 10P3 under special conditions.

The check-out relay 10CO is connected by circuit means to a line circuit which includes wires 10—12L1 and 10—12L2 which connect signal locations G10 and G12. Relay 10CO is assumed to be of the biased-polar type which can pick up its armature only when energy of a particular polarity is applied, the direction of current under the pick-up conditions being indicated by an arrow. Also associated with this line circuit is a battery B1 and limiting resistors which will be described. Since the apparatus at the next signal G12 location are not shown, but are assumed to be identical to those at signal G10 location, the other end of the line circuit can be described with reference to circuits at signal G10 location which cooperate with a similar line circuit connecting this location to the preceding signal G9 location. Included in the latter line circuit is a battery B2, a manual check-out button 10MCB and line wires 9—10L1 and 9—10L2. Therefore, a similar battery B2 and manual check-out button are provided at signal G12 location and are connected to one end of the line wires 10—12L1 and 10—12L2.

In considering the line circuits, it can be noted here that a signal control relay 11GR is connected to the line wires and acts to control both the signal and marker signal at signal G11 location. Relay 11GR is assumed to be of the retained-neutral polar type which is responsive both to energization and to the polarity of such energization. The function and operation of the intermediate signal apparatus will be described later in detail.

At signal G10 location, the (+) terminal of battery B1 is normally connected to the line wire 10—12L1 through front contacts 115 and 116 of relay 10P5, the winding of relay 10CO, front contact 117 of relay 10P5, front contact 118 of relay 10P1 and a limiting resistor 119. The (—) terminal of battery B1 is normally connected to the line wire 10—12L2 through front contact 120 of relay 10P5 and front contact 121 of relay 10P1. The normal connections described result in the polarities of the respective line wires 10—12L1 and 10—12L2 being (+) and (—). The polarity of the line wires is reversed whenever relay 10P1 is deenergized closing its back contacts 118 and 121. The normal connections described are such that the flow of current in the winding of relay 10CO is opposite to that required for picking up the relay. Whenever relay 10P5 is deenergized, the battery B1 is disconnected from the line circuits by the opening of front contacts 115 and 120 of relay 10P5, and a limiting resistor 122 is inserted in place of the battery by back contacts 115 and 123 of relay 10P5. The resistor 122 is connected in series with relay 10CO by the concurrent closings of back contacts 116 and 117 of relay 10P5.

With regard to the line circuits extending between signal G10 location and the preceding signal location (G9), the (+) terminal of a battery B2 can be connected to the line wire 9—10L2 through front contact 124 of relay 10P2, wire 125, back contact 126 of relay 10P1, and front contact 127 of relay 10P3. Under similar conditions, the (—) terminal of battery B2 can be connected to the line wire 9—10L1 through front contact 128 of relay 10P2 and wire 129. Under different conditions to be described, the (+) terminal of battery B2 can be connected to the line wire 9—10L1 through back contact 124 of relay 10P2, wire 130, and contact 131 of the manual check-out button 10MCB. Under the same conditions, the (—) terminal of battery B2 can be connected to the line wire 9—10L2 through back contact 128 of relay 10P2, wire 132, and contact 133 of the manual check-out button 10MCB.

The line circuits described provide means for selectively energizing the line wires between two signal locations and for selectively determining the polarity of energization of the line circuits. The battery B2 at any location is assumed to have twice the voltage of any B1 battery at the preceding signal location; in this manner, the batteries can function either independently or in series to provide different conditions of line polarity. Since the check out relay 10CO is of the biased polar type, the relay can be operated only under particular conditions of polarity. By the same token, intermediate signal control relays such as 11GR are also effected by conditions of line polarity.

The signal G10 operating mechanism is controlled by a circuit including contact 135 of relay 11YGP, wire 136, front contact 137 of relay 10P1, front contact 138 of relay 10P3, front contact 139 of relay 10P4, front contact 140 of relay 10P5, back contact 141 of relay 10P6, back contact 142 of relay 10CO, contact 143 of the manual check-out button 10MCB, contact 144 of the emergency release button 10RPB, front contact 145 of a track relay 10TR, the signal mechanism, wire 146, and contact 147 of relay 11YGP. The control circuit for signal G10 is closed only when all of the detection relays, the track relay and the various manual buttons are in their normal operating conditions, and the polarity of the signal control circuit is dependent upon the condition of relay 11YGP which reflects the condition of signal G11.

Signal G11 is operable in response to the condition of the associated track circuit and to the operated condition of the control relay 11GR. Contacts 148 and 149 of relays 11GR and 11TR, respectively, are shown in the control circuit for signal G11. The signal control relay 11GR is assumed to close its polar contacts such as 150 to the left whenever the polarity of line wire 10—12L1 is positive with respect to line wire 10—12L2, the polar contacts being closed to the right for a reversal of polarity. Relay 11GR is assumed to pick up its neutral armature irrespective of polarity and is capable of retaining its armature during momentary interruption of energy during pole changes in the line circuit. Thus, neutral contacts such as 148 and 151 are normally closed and open only when the line circuit is deenergized.

As previously stated, a marker signal is provided to act in conjunction with signal G11. The marker signal, as shown in the drawings, is energized whenever relay 11GR is energized by energy of the normal line circuit polarity, and the relay is deenergized when the line circuit is either pole changed or deenergized.

When the front of a train is detected entering the track section 10T, the wayside detection apparatus is activated causing the energization of relay 10R1. Back contact 96 of relay 10R1 opens to deenergize the entrance repeater relay 10P1. Front contacts 118 and 121 of relay 10P1 open, followed by the subsequent closing of back contacts 118 and 121 of relay 10P1. As a result the polarities of the line wires 10—12L1 and 10—12L2 are reversed. Specifically, the (+) terminal of the battery B1 is connected to the line wire 10—12L2 through front contacts 115 and 116 of relay 10P5, the winding of relay 10CO, front contact 117 of relay 10P5, and back contact 118 of relay 10P1. The (—) terminal of battery B1 is connected to the line wire 10—12L1 through front contact 120 of relay 10P5 and back contact 121 of relay 10P1. The reversal of line circuit polarity causes relay 11GR to open its left hand polar contacts, causing the deenergization of the marker signal at signal location G11. Front contact 137 of relay 10P1, when opened, deenergizes the signal G10 mechanism causing signal G10 to display a stop aspect.

The described conditions exist until the entire train is detected passing signal G12 location. However, the detection of the rear of the train passing signal G10 location operates the line circuit extending to signal G9 location. Specifically, upon the detected passage of the rear of the train, relay 10R2 is energized closing its contact 99 to energize relay 10P2. At this time, the (+) termnial of the battery B2 is connected to the line wire 9—10L2 through front contact 124 of relay 10P2, wire 125, back contact 126 of relay 10P1 and front contact 127 of relay 10P3. The (—) terminal of the battery B2 is connected to the line wire 9—10L1 through front contact 128 of relay 10P2 and wire 129. Since the receiving circuits at signal G9 location are identical to those described at signal G10 location, it can be noted here that the polarity of the line circuit is such that line wire 9—10L2 is positive with respect to 9—10L1, and the potential applied to the line wires is that provided by battery B2.

Assuming now that the train in passing signal G12 location operates similar circuits causing a battery B2 at that location to apply (+) and (—) polarities to the line wires 10—12L2 and 10—12L1, respectively, it can be seen that battery B2 at signal G12 location is connected in series with the check-out relay 10CO and the battery B1 at signal G10 location. Since the battery B2 at signal G12 location has a potential which is double that of battery B1 at signal G10 location, the resultant potential across the line wires 10—12L1 and 10—12L2 is at the normal level of battery B1 but of the reverse polarity. It can be seen further that under these conditions, relay 10CO can be picked up by a circuit extending from line wire 10—12L2 through back contact 118 of relay 10P1, front contact 117 of relay 10P5, the winding of relay 10CO, front contact 116 of relay 10P5, front contact 115 of relay 10P5, the battery B1, front contact 120 of relay 10P5, and back contact 121 of relay 10P1 to the line wire 10—12L1. The direction of current in this circuit is proper for picking up relay 10CO.

When relay 10CO picks up, its front contact 111 closes to energize the restoration relay 10P6. Relay 10P6, in turn, closes its front contact 98 to permit the picking up of relay 10P1. Relay 10P1 is then held by its stick circuit and acts to reverse the polarity of the circuit for energizing relay 10CO from the line wires 10—12LI and 10—12L2. Since the high voltage applied to a line circuit is dependent upon the release time of the P2 relay at a particular location, the duration of the voltage pulse is long enough to permit relays such as 10CO, 10P6 and 10P1 to operate, and after the relays have operated relays 10CO and 10P6 are again deenergized. Thus, the circuits at signal G10 location are restored to their normal condition.

Conditions will now be described wherein two trains are detected passing signal G10 location before the first of the two trains is detected passing signal G12 location. In other words, two trains occupy the stretch of track between signal locations G10 and G12 concurrently.

When the front and rear of the first train is detected passing signal G10 location, relays 10R1, 10P1, 10R2 and 10P2 are operated in the manner previously described. The line wires 10—12L1 and 10—12L2 are pole changed by relay 10P1 so that the polarity of wire 10—12L2 is positive with respect to wire 10—12L1. Signal G10 is operated to display a stop aspect by the opening of front contact 137 of relay 10P1. The pole changing of the line circuit causes relay 11GR to open its contact 150, extinguishing the marker signal at signal G11 location. When the rear of the first train passes the detector 10D2, relay 10R2 is energized. Back contact 105 of relay 10R2 opens the stick circuit for relay 10P4, and since the pick-up circuit for relay 10P4 is open at front contact 103 of relay 10P1, relay 10P4 is deenergized.

The second train is governed by a stop aspect at signal G10 location, but if signal G10 is a permissive signal the second train can continue at reduced speed after stopping. When the front of the second train is detected by the detector 10D1, relay 10R1 is energized opening its back contact 109 in the stick circuit for relay 10P5. Relay 10P5 is thereby deenergized because its pick-up circuit is already opened by front contact 107 of relay 10P4. When relay 10P5 releases its armature its front contact 140 opens in the control circuit for signal G10 and its various contacts 115, 116, 117, 120 and 123 are operated in the previously described line circuit. The line circuit is now arranged so that the battery B1 is disconnected and is replaced by the limiting resistor 122. Since at this time both relays 10P1 and 10P5 are deenergized, relay 10CO is connected to the line circuit in a manner such that it can be picked up only when line wire 10—12L2 is positive relative to the line wire 10—12L1.

When the first train is detected passing signal G12 location, the front and rear train-carried apparatus operates the wayside detection circuits in the usual manner, resulting in the deenergization of relays 12P1 and 12P4 (not shown) and in the energization of relay 12P2 (not shown). The circuit operations which result are identical to those which can be demonstrated for energizing the line wires 9—10L1 and 9—10L2 to operate the various relays at signal G9 location. Specifically, the (+) terminal of the battery B2 is connected to a line wire 9—10L2 through front contact 124 of relay 10P2, wire 125, back contact 126 of relay 10P1, and front contact 127 of relay 10P3. The (—) terminal of battery B2 is connected to the line wire 9—10L1 through front contact 128 of relay 10P2 and wire 129. Thus, similar circuit operations at signal G12 location cause the energization of the line wires 10—12L1 and 10—12L2 so that the polarity of wire 10—12L2 is positive. The connecting circuits between the line wires and relay 10CO extends from line wire 10—12L2 and includes back contact 118 of relay 10P1, back contact 116 of relay 10P5, the winding of relay 10CO, back contact 117 of relay 10P5, back contact 115 of relay 10P5, resistor 122, back contact 123 of relay 10P5, and back contact 121 of relay 10P1 to the line wire 10—12L1. The direction of current in the traced circuit is not correct for picking up relay 10CO. Thus, the failure of relay 10CO to be picked up by the passage of the first train by signal G12 location does not result in the restoration of the relay circuits at signal G10 location.

When the second train is detected passing signal G12 location, similar operations result, and the similar energization of the line circuit cannot result in the energization of relay 10CO. The only manner in which relay 10CO can be picked up under the existing conditions is by the manual operation of a check out button such as 10MCB. When the check out button 10MCB at signal G10 location is actuated, the (+) terminal of battery B2 is connected to the line wire 9–10L1 through back contact 124 of relay 10P2, wire 130 and contact 131 of the button 10MCB. The (—) terminal of battery B2 is connected to the line wire 9—10L through back contact 128 of relay 10P2, wire 132 and contact 133 of the button 10MCB. Thus, the actuation of a similar button 12MCB (not shown) results in a line circuit polarity in which wire 10—12L1 is positive with respect to wire 10—12L2. Since this polarity is correct for picking up relay 10CO, relay 10CO is energized closing its front contact 111 to energize the restoration relay 10P6 which, in turn, closes its front contact 98 in the pick-up circuit for relay 10P1. The subsequent closing of front contact 103 of relay 10P1 energizes relay 10P4 which is then held by its stick circuit. Relay 10P4, in turn, causes the energization of relay 10P5 by the closing of its front contact 107. Since the energization of relay 10CO is momentary, dependent upon the slow-release time of the P2 relay at the next signal location, relay 10CO is subsequently deenergized, followed by the deenergization of the restoration relay 10P6. At this time, the circuits at signal G10 location are restored to normal.

When the polarity of the line circuit became correct for the picking up of relay 10CO, the polarity was also correct for operating relay 11GR to close its left hand polar contacts. Thus, the marker signal at signal G11 is illuminated.

From the foregoing description it can be seen that the automatic restoration of the detection circuits at a signal location can be accomplished only so long as a second train does not pass the location before a first train has been detected leaving the exit end of the block; that is, so long as not more than one train occupies a block at one time. If two or more trains occupy the same block concurrently signal protection is afforded to the trains, but train operation would be penalized by delays because of the need to restore the detection circuits manually by authorized personnel under the direction of a dispatcher. Therefore, the circuits as shown in Figs. 3A and 3B assume that the occupancy of the stretch of track by two or more trains is a rare occurrence, and when such conditions exist the clearing of signals to the rear must be accomplished by manual means. In this manner, train crews are forced to consult a central dispatcher whenever their train is one of a plurality to occupy a stretch of track. The dispatcher, being aware of traffic conditions, can thereby authorize the personnel on the last train to operate the manual check out button at the exit signal location to restore the signals in the rear. Manual check out controls can also be effected by a central dispatcher whenever remote control circuits are provided.

Attention can now be called to the mode of operation of the various signals in response to special trains and standard trains. Since standard trains are capable of effectively shunting track circuits, it can be seen in the drawings that the shunting of a track relay results in the operation of the associated signal to display a stop aspect. Signal operations resulting from operations of the special detection circuit means also result in putting signals to stop behind trains whenever such signals have associated detection apparatus. Intermediate signals which are located between detection points and which are not provided with detection apparatus are operated in advance of a detection point upon the passage of a non-shunting, equipped train. Whenever a single special train is detected, the aspect displayed by an intermediate signal in advance is not changed, but the marker signal associated with the intermediate signal is deenergized. The passage of a second detected train into a track section results in the actual operation of the intermediate signals to display restrictive aspects. The purpose of the marker signals is to indicate to trains the difference between track occupancies associated with standard trains and special trains. When a standard train approaches an intermediate signal the train is governed by both the signal aspect and the condition of the marker signal. If the marker signal is extinguished the presence of a preceding special train is indicated. Therefore, the marker signal must govern standard trains so that reductions in speed are effected to prevent the possible overtaking of a special train. An extinguished marker signal is not binding on a special train, however, because such conditions would indicate to the engineman that such signal conditions were caused in advance by the passage of his train by the preceding check point. Whenever an intermediate signal actually displays a restrictive aspect, it is binding on a special train because such an indication shows, depending on the condition of the marker signal, that either more than one special train or a standard train occupies the stretch of track. Observance of the special proposed signalling conditions can be easily incorporated into operating rules so that both standard and special trains can be governed safely and expediently.

*Fig. 5.—Apparatus and circuit operation*

The circuits in Fig. 5 disclose means for transmitting train detection information between signal locations via track rails instead of line wires.

The track sections 9T, 10T, 11T and 12T are indicated and are assumed to be identical to those described in Figs. 3A and 3B. Signal G10 location is provided with identical train detection apparatus and repeater relays. The modification in the present circuits concerns the track circuit associated with track section 10T.

More specifically, the track circuit associated with track section 10T includes a track relay 10TR and a plurality of batteries 153, 154 and 155. The track relay 10TR is assumed to be energized normally by a low voltage battery such as 153. The use of the remaining batteries will be described.

The apparatus at signal G10 location includes, as before, a restoration relay 10P6, a manual check out button 10MCB and an emergency release button 10ERB. The check out relay 10CO described in the previous circuits is eliminated from the present arrangement.

In describing the track circuit associated with track section 10T, reference is made to a subsequent description of the battery and of a similar track circuit associated with track section 9T, and it will be further assumed that the battery end of track section 10T is governed by comparable apparatus associated with track section 12T. The track batteries associated with track section 9T are designated by reference characters 156, 157 and 158, and these batteries correspond to batteries 153, 154 and 155 previously noted. Under all conditions the (+) terminal of battery 156 is connected to the upper rail of track section 9T through a limiting resistor. Under normal conditions the negative terminal of battery 156 is connected to the lower rail of track section 9T through a contact 159 of the manual check out button 10MCB and back contact 160 of relay 10P2. Under these conditions, the associated track circuit is sufficiently energized to pick up a track relay 9TR (not shown) and to render the relay responsive to train shunts.

When the special detection circuits associated with track section 10T are operated by a passing train, a higher voltage is applied to the rails of track section 9T. The upper rail of track section 9T is connected, as before, to the (+) terminal of battery 156. The lower rail of track section 9T, however, is connected to the negative terminal of battery 157 through front contact 160 of relay 10P2, back contact 161 of relay 10P1, front contact 162 of relay 10P3, and front contact 163 of relay 10P5. Whenever the manual check-out button 10MCB is operated, the batteries 156, 157 and 158 are connected in series and their additive potentials are applied to the rails of track setcion 9T. The (+) terminal of battery 156 remains connected to the upper rail of track section 9T, and the (−) terminal of battery 158 is connected to the lower rail of track section 9T through contact 164 of the manual check-out button 10MCB and back contact 160 of relay 10P2. It can now be assumed that the batteries 153, 154 and 155 are selectively connected to the rails of track section 10T by similar circuit means associated with signal G12 location.

The track relay 10TR is normally energized by a circuit including front contact 165 of relay 10P1. Whenever relay 10P1 is deenergized, the track relay is also deenergized.

When relay 10TR is dropped away, its back contact 166 closes in a pick-up circuit for the restoration relay 10P6, and this pick-up circuit also includes either resistor 167 or 168, contact 169 of relay 10P5, and back contact 165 of relay 10P1. Thus, the restoration relay 10P6 is selectively connected to the rails of track section 10T and can be operated in accordance with the voltage applied to the track rails.

When the front of the train is detected passing signal G10 location, relay 10P1 is deenergized opening its front contact 165 to deenergize the track relay 10TR. When back contact 166 of relay 10TR closes, relay 10P6 is connected to the track rails through resistor 167. The resistor 167 is assumed to have sufficient resistance to prevent the picking up of relay 10P6 by normal track voltage, but will permit relay 10P6 to be picked up whenever the magnitude of the interrail potential is at the order of that supplied by batteries 153 and 154 in series. An interrail potential of this magnitude will be provided only when the train is detected passing signal G12 location. At such time, the circuits at signal G12 location would be operated in the same manner as those shown at signal G10 location for the operation of the restoration relay (not shown) at signal G9 location. In describing this operation as applied to signal G10 location, the passage of a train results in the deenergization of relay 10P1 and the energization of relay 10P2 which, as previously described, connects batteries 156 and 157 in series to the rails of track section 9T. Therefore, a comparable operation at signal G12 location connects batteries 153 and 154 in series to the rails of track section 10T and causes the energization of relay 10P6.

It is assumed here that the energization of relay 10P6 results in the energization of relay 10P1 as described in Figs. 3A and 3B. Furthermore, the duration of the application of higher energy to pick up relay 10P6 is dependent upon the slow release time of the P2 relay at signal G12 location. Thus, the restoration relay 10P6 is energized briefly, for a time interval sufficient to permit the picking up of relay 10P1 which is then held by a stick circuit. The track relay 10TR can now be picked up through its pick-up circuit including front contact 165 of relay 10P1, and the pick-up energy for relay 10TR is supplied by battery 153 which is now the only battery connected across the rails of track section 10T because of the dropping away of the P2 relay associated with signal G12 location.

Whenever two trains are detected passing signal G10 location before the first train is detected passing signal G12 location, the second train causes the deenergization of relays 10P1 and 10P5 as described with reference to Figs. 3A and 3B. It can be seen that under these conditions back contacts 165 and 169 of relays 10P1 and 10P5, respectively, connect relay 10P6 in series with the resistor 168. Resistor 168 is assumed to have sufficient resistance to prevent the picking up of relay 10P6 in response to any rail potential which is below that which can be supplied by the batteries 153, 154 and 155 in series. As previously noted, batteries 153, 154 and 155 can be connected in series only when manual check out operations are effected. Thus, the mode of operation of the restoration circuits is identical to that described for the line wire circuits shown in Figs. 3A and 3B. Specifically, automatic restoration of the circuits at a signal location can be effected only when a single train is involved. When a plurality of trains are involved, restoration of the circuits associated with the signal in the rear can be effected only by manual operations of a check-out button under the directions of a central dispatcher.

Although the described use of the track rails for transmitting train entrance-exit information has been shown as a modification of the circuits shown in Figs. 3A and 3B, similar use can be made of the track rails for the system shown in Fig. 1. It should be obvious that the basic principle involved in the use of the track rails in track-circuited territory is that an entrance repeater relay P1 functions to selectively connect either a track relay or a restoration relay P6 to the track rails, while the relays P1 and P2 at the next signal location in advance are used to selectively apply energy to the track rails. In all cases, the circuits must be arranged so that a restoration relay P6 cannot be picked up by normal track energy, but must be picked up by a higher level of energy.

It should be noted that during the operations described the track relay 10TR is effectively disconnected from the rails until the restoration circuit operations are completed.

Whenever unusual conditions exist, such as loss of power, the circuits associated with a signal location can be restored to normal by means of an emergency release button such as 10ERB. Whenever the button 10ERB is actuated, an obvious pick-up circuit for relay 10P6 is established. The picking up of relay 10P6 results in the energization of relay 10P1, and in the further energization of the other repeater relays at the location. It is assumed that an emergency release button will be used only when unusual conditions exist and will never be used unless under the direction of a central dispatcher.

*Figs. 4A, 4B and 4C.—Apparatus and circuit operation*

The circuits shown in Figs. 4A–4C are a modified version of those previously described relative to Figs. 3A and 3B. The present circuits provide means for counting the number of special trains which enter a stretch of track, or block, and for further counting such trains leaving the block. A comparison between the counting-in and counting-out operations provides means for selectively controlling signals to govern trains in accordance with block occupancy conditions.

As before, the reference characters 19 designate the rails of a stretch of track which is divided into a plurality of track sections 9T, 10T, 11T and 12T. The track sections are assumed to include track circuits which are bounded by insulated rail joints 20. At the entrance to each track section, a searchlight signal such as G10, G11 and G12 is provided. Signals G10 and G12 are assumed to be block entrance signals, while signal G11 is an intermediate signal. A marker signal is provided at signal G11 location to modify the aspects displayed by signal G11.

Signal locations G10 and G12 are assumed to have associated wayside train detection apparatus, the complete apparatus being shown for signal G10 location only.

Train entrance at signal G10 location is detected by a detector 10D1 and a tuned circuit 10C1 which, when activated, energizes an entrance detection relay 10R1. Stick energy for relay 10R1 is provided by a circuit including front contact 170 of an entrance repeater relay 10P1 and front contact 171 of relay 10R1. The detection of the rear of the train is performed by a detector 10D2 and associated tuned circuit 10C2 which, when activated, energizes an exit detection relay 10R2. Holding energy for relay 10R2 is provided by a circuit including back contact 172 of an exit repeater relay 10P2 and front contact 173 of relay 10R2.

As in the previously described circuit arrangements, the present circuits include an entrance repeater relay 10P1, an exit repeater relay 10P2 which is slow acting, and a detection repeater relay 10P3. In addition to these particular relays, a slow-release check relay 10CK and a check repeater relay 10CKP are provided to detect circuit operations resulting from the passage of one or more trains. The function of the check and check repeater relays will be evident as the description progresses.

In order to count the number of trains passing signal G10 location to occupy the stretch of track between that signal location and signal G12 location, a bank of counting relays E1, E2 and E3 is provided, along with a second bank of counting relays L1, L2 and L3. The relays E1, E2 and E3 are entrance counting relays, while relays L1, L2 and L3 are exit counting relays. The entrance counting relays are actuated in response to operations of the entrance repeater relay 10P1 in a manner to be described, and the exit repeater relays are actuated by a check-out relay CO in a manner to be described.

The check out relay CO which is shown associated with signal G10 location is similar to that previously described in the other circuit arrangements and can be selectively energized by line circuit means extending between signal locations G10 and G12. Each line circuit between successive block entrance signal locations includes a battery B1 and a high voltage battery B2, identical to those previously described. The two batteries are selectively connected and disconnected in the line circuit to change the line circuit polarity for operating the associated check out relay and to operate control relays for intermediate signals such as G11.

The entrance repeater relay 10P1 is normally energized by a stick circuit extending from (+), including back contact 174 of relay 10R1, front contact 175 of relay 10P1, the winding of relay 10P1, and front contact 176 of relay 10P3, to (−). A pick-up circuit for relay 10P1 includes a network of contacts of relays E1, E2, E3, L1, L2 and L3 which feed (+) energy through wire 177, front contact 178 of relay 10P2, back contact 179 of relay 10R2, and back contact 179*a* of relay 10R1 to the winding of relay 10P1. This pick-up circuit will be described later in detail. It can be stated that in general relay 10P1 is normally energized by a stick circuit and can be reenergized by its pick-up circuit dependent upon the condition of the various counting relays.

The exit repeater relay 10P2 can be energized by a pick-up circuit including front contact 180 of relay 10R2. Relay 10P2 is of the slow release type to provide adequate time for operating the circuits associated with the preceding signal location, as described with reference to the other drawings.

The detection repeater relay 10P3 is normally energized by a stick circuit including back contact 180 of relay 10R2 and front contact 181 of relay 10P3. A second source of stick energy for relay 10P3 is provided by back contact 182 of relay 10P1. The function of relay 10P3 is to detect the passage of trains when the rear of the train is detected but the front of the train is not detected.

Additional energizing circuits for relays 10P1 and 10P3 are available through contacts 183 and 184 of an emergency release button 10ERB which is assumed to be operated only under unusual conditions.

The check relay 10CK is normally energized from a network of contacts associated with relays E1, E2, E3, L1, L2, and L3 through a wire 185 and front contacts 186 and 187 of relays 10P3 and 10P1, respectively. Relay 10CK is assumed to be energized whenever the respective counting positions of the entrance and exit counting relay banks are in agreement, and provided that the repeater relays 10P1 and 10P3 are energized.

The check repeater relay 10CKP is normally energized by either a pick-up circuit or a stick circuit. The stick circuit includes front contact 188 of relay 10CKP, back contact 188*a* of relay 10R1, front contact 189 of relay 10P3, and the upper winding of relay 10CKP; the pick-up circuit includes front contact 192 of relay 10CK and front contact 189 of relay 10P3. Another pick-up circuit for relay 10CKP includes a network of contacts associated with relays E1, E2, E3, L1, L2 and L3, wire 190, front contact 191 of relay 10P1, and front contact 189 of relay 10P3. A second stick circuit for relay 10CKP includes another network of counting relay contacts, wire 177, front contact 193 of relay 10CKP, front contact 194 of relay 10P3, and the lower winding of relay 10CKP. The mode of operation of the relay 10CKP will be more apparent later but can be briefly described as being that the relay is deenergized upon the detected passage of more than one train and can be reenergized only when the entrance and exit counting circuits indicate that the number of trains occupying the stretch of track is not more than one.

The line circuit between signal locations G10 and G12 includes line wires 10—12L1 and 10—12L2 along with the various batteries and the check-out relay 10CO which is of the biased-polar type. Under normal conditions, the (+) terminal of battery B1 is connected to the line wire 10—12L1 through front contact 195 of relay 10CKP, wire 196, the winding of relay 10CO, wire 197, and front contact 198 of relay 10CK. The (−) terminal of battery B1 is connected to the line wire 10—12L2 through front contact 199 of relay 10CKP and front contact 200 of relay 10CK. Whenever relay 10CK is deenergized, its contacts 198 and 200 cross over from front to back and reverse the polarity applied to the line wires by battery B1. When relay 10CKP is deenergized, the crossing over of its contacts 195 and 199 disconnects the battery B1 from the line wires and inserts a limiting resistor 201 in series with the line circuit.

The entrance counting relays E1, E2 and E3 operate in response to operations of the entrance repeater relay 10P1, and the operated condition of these relays in conjunction with the condition of the exit counting relays provides various energizing circuit means for relays 10P1, 10CK and 10CKP. Therefore, the circuits for operating the counting relays along with a description of the operation of the relays should be given before further attention is directed to the operation of the circuits as a whole. In describing the operation of the counting relays, attention can be given to Fig. 8 which indicates the sequence in which relays E1, E2 and E3 are operated in response to the indicated operations of relay P1. The arrows shown in Fig. 8 indicate the picking up and dropping away of each relay at a particular time. The counting relays form a binary counter and are operable in eight different combinations, or steps. The steps are numbered 0–8, and the initial condition (step 0) is identical to the final condition (step 8) at the end of a counting cycle.

Relay E3 is energized initially by a stick circuit including front contact 202 of relay E3 and back contact 203 of relay E2. Relays E1 and E2 are both deenergized initially, and relay 10P1 is energized. When relay 10P1 is deenergized (step 1) relay E1 is picked up by a circuit including back contact 204 of relay 10P1, wire 205, front contact 206 of relay E3, and back contact 207 of relay E2. Front contact 208 of relay E1 then closes to provide stick energy for relay E1 through front contact 206 of relay E3 and back contact 207 of relay E2. When relay 10P1 is again energized (step 2) back contact 204 of relay 10P1 opens the pick-up circuit for relay E1, but relay E1 is held energized by its previously described stick circuit. The subsequent closing of front contact 204 of relay 10P1 provides another stick circuit for relay E1 which includes front contact 208 of relay E1 and wires 205 and 209. At the same time, front contact 210 of relay 10P1 closes to energize relay E2 through a pick-up circuit including wire 211 and front contact 212 of relay E1. Front contact 213 of relay E2 closes to provide stick energy for relay E2 through front contact 214 of relay E3. At this time, relay E3 is held energized by a circuit including its stick contact 202 and front contact 215 of relay E1. When relay 10P1 is again deenergized (step 3), front contact 204 of relay 10P1 opens the stick circuit for relay E1 causing that relay to drop away. No other stick circuit is available for relay E1 since contacts 206 and 207 of relays E3 and E2, respectively, are not in proper circuit alignment. The dropping away of relay E1 results in the crossing over of its contacts 212, 215 and 216, causing relay E3 to be energized at this time by a circuit including front contact 202 of relay E3, back contact 216 of relay E1, wire 216*a*, back contact 210 of relay 10P1, wire 211, and back contact 215 of relay E1. The next energization of relay 10P1 (step 4) results in the deenergization of relay E3, since back contact 210 of relay 10P1 opens the previously described stick circuit for relay E3. The next deenergization of relay 10P1 (step 5) results in the energization of relay E1 through back contact 204 of relay 10P1, wire 205, back contact 206 of relay E3 and front contact 207 of relay E2. Front contact 208 of relay E1 then closes to provide stick energy. The energization of relay E2 at this time is through a circuit including front contact 213 of relay E2, front contact 216 of relay E1, wire 216*a*, back contact 210 of relay 10P1, wire 211, and front contact 212 of relay E1. When relay 10P1 is again energized (step 6) back contact 210 of relay 10P1 breaks the previously described stick circuit for relay E2 causing relay E1 to drop away. During this operation, relay E1 is held energized through first one then the other of its previously described stick circuits, the latter including front contact 204 of relay 10P1. The next deenergization (step 7) of relay 10P1 opens the stick circuit for relay E1, and since the alignment of contacts 206 and 207 of relays E3 and E2, respectively, is incorrect for closing the second stick circuit, relay E1 drops away. The next energization of relay 10P1 (step 8) causes the energization of relay E3 through front contact 210 of relay 10P1, wire 211, and back contact 215 of relay E1. The stick circuit for relay E3 including its front contact 202 and back contact 203 of relay E2 closes. At this point, the counting relays have performed a complete cycle of operation which began and ended with relays E1 and E2 deenergized and relay E3 energized.

The exit counting relays L1, L2 and L3 are controlled in an identical manner in response to operations of the check out relay 10CO. A comparison of the two counting circuits will show that they are identical with the exception that contacts 217 and 218 of relay 10CO are the reverse of contacts 204 and 210 of relay 10P1. The reason for this is that relay 10P1 is a normally energized relay, while relay 10CO is a normally deenergized relay.

The line circuit extending from signal G10 location to the preceding signal location includes the battery B2 and line wires 9—10L1 and 9—10L2. Under normal conditions, the battery B2 is disconnected from the line wires. The (+) terminal of battery B2 can be connected to the line wire 9—10L2 through contact 220 of the manual check out button 10MCB and contact 221 of relay 10P2. The (—) terminal of battery B2 can be connected to the line wire 9—10L1 through either of two circuits; one circuit includes contact 222 of the check out button 10MCB, back contact 223 of relay 10CK, front contact 224 of relay 10P3, front contact 225 of relay 10P2 and back contact 226 of relay 10R2; the other circuit includes contact 222 of the check out button 10MCB, back contact 225 of relay 10P2 and back contact 226 of relay 2R2. Normal circuit operations in response to a passing train cause relay 10CK to be deenergized and relay 10P2 to be energized, causing the battery B2 to be connected to the line wires so that line wire 9—10L2 has a positive polarity with respect to line wire 9—10L1. The same polarity can be given to the line circuit by the actuation of the manual check out button 10MCB. The operation of the check out button 10MCB occurs only under special circumstances to be described, while the relay-actuated circuit means for energizing the line wires is provided for automatic restoration of the signal control circuits.

A circuit network similar to that described in the preceding paragraph is assumed to be provided at signal G12 location and operates to energize the line wires 10—12L1 and 10—12L2 by a battery B2 in an identical manner. In other words, when a complete train is detected passing signal G12 location, the (+) and (—) terminals of a battery B2 at that location are connected, respectively, to the line wires 10—12L2 and 10—12L1. The battery can be connected to the line wires in the same manner by the operation of a manual check-out button 12MCB (not shown).

The line circuit between signal locations G10 and G12 is used both for the operation of the check-out relay 10CO and the operation of intermediate signal control relays 11GB and 11GR. Relay 11GB is of the biased polar type which can be picked up only by energy of a particular polarity. Relay 11GR is of the retained-neutral type which has a neutral armature responsive to energy of either polarity and which retains its armature in a picked-up condition during momentary changes in line polarity. Under normal conditions, the line wire 10—12L1 is connected to the (+) terminal of battery B1 by a previously described circuit which includes the winding of relay 10CO. The line wire 10—12L2 is normally connected to the (—) terminal of battery B1 by a circuit previously described. The polarity of line wire 10—12L1, therefore, is positive with respect to line wire 10—12L2, and this polarity is correct for energizing the biased polar relay 11GB which is connected directly to the line wires. Relay 11GR is also connected directly to the line wires 10—12L1 and 10—12L2. Therefore, whenever the line wire 10—12L1 is positive with respect to line wire 10—12L2 both relays 11GB and 11GR are energized. A reversal in the polarity of the line circuit as previously described in response to operations of relay 10CK results in the deenergization of relay 11GB but not of 11GR. A deenergization of the line wires which occurs as previously described when relays 10CK and 10CKP are both deenergized, results in the deenergization of both relays 11GB and 11GR. Whenever a battery B2 at signal G12 location is connected to the line wires the polarity of wire 10—12L2 is positive with respect to wire 10—12L1, and this polarity is incorrect for picking up relay 11GB, but it is correct for picking up relay 11GR. However, battery B2 is connected to the line wires for only a brief interval, and relays of the retained-neutral type, such as relay 11GR, are inherently slow in picking up their armatures. Thus, relay 11GR can be assumed to be incapable of picking up its armature during the interval when a battery B2 is connected to the line wires. It should be noted here that under automatic conditions the duration of the application of battery B2 to the line wires 9—10L1 and 9—10L2, for example, is dependent on the release time of relay 10P2 (front contact 225 of relay 10P2 closed). In order to preclude a long application of battery B2 energy which could result from the passage or stopping of the rear of a slow train in the vicinity of the detector 10D2, back contact 226 of relay 10R2 is included in the battery B2-line wire circuit. In this manner the length of an applied pulse is independent of train speed.

Under normal line circuit conditions wherein energization is provided by the battery B1, the direction of current in the circuit is opposite to that required for picking up relay 10CO. A reversal of the line polarity by contacts 198 and 200 of relay 10CK does not alter the direction of current in the check-out relay 10CO. The only manner in which relay 10CO can be picked up is when a battery B2 at signal G12 location is connected to the line circuit. Under such conditions, battery B2 is connected either in series and in opposition to the battery B1 or is connected in series with the limiting resistor 201, and in both circumstances, the direction of current is correct for picking up relay 10CO. Thus, whenever an entire train is detected passing signal G12 the line circuit is energized by a battery B2 at signal G12 location so that relay 10CO is picked up. Each time relay 10CO is so operated by a train passing signal G12, the exit counting relays L1, L2 and L3 are operated by contacts 217 and 218 of relay 10CO.

Assuming that the counting relays E1, E2 and E3 begin counting operations from an initial condition which is identical to an initial condition of the exit counting relays L1, L2 and L3, each time relays E1, E2 and E3 are operated by relay 10P1 in response to the passage of a train at signal G10 location, a circuit combination is obtained which differs from the initial condition of both counting relay banks. The respective conditions of the two counting relay banks is made identical again when the train is detected passing signal G12 location. Thus, various circuit networks including contacts of the counting relays can be utilized, as previously mentioned, to selectively operate relays 10P1, 10CK and 10CKP as will be described.

When a train is detected entering the track section 10T, relay 10R1 is operated opening its back contacts 174a and 179 to deenergize relay 10P1. The deenergization of relay 10P1 operates the entrance counting relay bank in a manner such that relays E1 and E3 are energized while relay E2 is deenergized. In order to provide means for energizing relay 10P1 so that the next step in a counting operation can be effected, a particular combination of counting relay contacts is provided for energizing relay 10P1. The condition of the counting relays permits relay 10P1 to be energized by a pick-up circuit including front contact 230 of relay E1, back contact 231 of relay E2, front contact 232 of relay E3, wire 177, front contact 178 of relay 10P2 and back contacts 179 and 179a of relays 10R2 and 10R1, respectively. Contact 178 of relay P2 prevents the pick up at relay 10P1 until the rear of the train is detected passing signal G10 location. Reference to the sequence chart in Fig. 8 shows that the next conditions under which relay 10P1 must be energized occurs on step 3 when relays E2 and E3 are energized while relay E1 is deenergized. Under these conditions, the counting relay contacts which energize relay 10P1 are back contact 230 of relay E1, front contact 233 of relay E2 and front contact 234 of relay E3. The next time that a pick-up circuit is established for relay 10P1 occurs on step 5, at which time relays E1 and E2 are energized while relay E3 is energized. This pick-up circuit includes front contact 230 of relay E1, front contact 231 of relay E2 and back contact 235 of relay E3. The remaining contact combination for picking up relay 10P1 occurs on step 7 and includes back contact 230 of relay E1, back contact 233 of relay E2, and back contact 236 of relay E3.

In view of the preceding description, it can be seen that relay 10P1 is deenergized in response to the detection of the front of a train and causes the entrance counting relays to advance one step in their sequence of operation. When the counting relays are fully operated to this condition and when the detection of the rear of the train causes the picketing up of relay 10P2, a pick-up circuit is established for reenergizing relay 10P1, and relay 10P1 is then held energized by its stick circuit until the front of the next detected train passes. Thus, the passage of a train causes the entrance counting relays to progress through two operational steps. The odd-numbered steps 1, 3, 5 and 7 show the condition of the counting relays caused by the passage of the fronts of successive trains, while the even-numbered steps show conditions caused by the detected passage of the rears of the respective trains.

The check relay 10CK is deenergized whenever the detection of the train results in the deenergization of relay 10P1. Once deenergized, relay 10CK can be reenergized only when the operated conditions of the entrance counting relays and exit counting relays are identical. Under initial conditions as shown in the drawings, energy is supplied to relay 10CK through back contact 230 of relay E1, back contact 233 of relay E2, front contact 236 of relay E3, front contact 237 of relay L3, back contact 238 of relay L2, back contact 239 of relay L1 and the wire 185. When the relays E1, E2 and E3 are operated in response to operations of relay 10P1 caused by the detection of a train, the previously described circuit for energizing relay 10CO is operated in response to the passage of the train 1) and again at back contact 233 of relay E2 (step 2). Thus, relay 10CK can be again energized only when relay 10CO is operated in response to the passage of the train by signal G12 location, causing relays L1, L2 and L3 to advance through two operational steps. At this time, relay 10CK can be energized through front contact 230 of relay E1, front contact 231 of relay E2, front contact 235 of relay E3, front contact 240 of relay L3, front contact 241 of relay L2, front contact 230 of relay L1, and the wire 185. Therefore, relay 10CK can be energized only when the operated conditions of the respective entrance and exit counting relay banks are in agreement, indicating that the stretch of track between signal locations G10 and G12 is unoccupied; or in other words, the number of trains detected leaving is equal to the number detected entering.

Initially relay 10CKP is energized by two previously described circuits; one includes front contact 188 of relay 10CKP, back contact 188a of relay 10R1 and front contact 189 of relay 10P3; the other includes front contact 192 of relay 10CK and front contact 189 of relay 10P3. When the front of a train is detected, relay 10R1 is energized opening its back contact 188a in one of the energizing circuits for relay 10CKP, but relay 10CKP is held by the other circuit. Relay 10P1 is deenergized by the energization of relay 10R1 and operates the counting relays E1, E2 and E3 to the condition shown on step 1 in Fig. 8. Relay 10P1 also deenergizes relay 10CK which is slow-release. Thus, contact 192 of relay 10CK holds relay 10CKP energized until the entrance counting relays are fully operated and close another energizing circuit for relay 10CKP; this circuit includes front contact 230 of relay E1, back contact 231 of relay E2, front contact 232 of relay E3, wire 177, and front contacts 193 and 194 of relays 10CKP and 10P3, respectively. After the passage of the front of the train relay 10R1 is deenergized closing its back contact 188a to complete another stick circuit for relay 10CKP.

When the rear of the train passes, relays 10R2 and 10P2 are operated as described, and relay 10P1 is again energized when contacts 178 and 179 of the respective relays 10P2 and 10R2 are closed. Relay 10P1 is then held by its stick circuit and operates relays E1, E2 and E3 to their conditions defined by step 2 in Fig. 8. At this time the circuits holding relay 10CKP energized are: one including contacts 188, 188a and 189 of relays 10CKP, 10R1 and 10P3, respectively; another including back contact 242 of relay L1, back contact 243 of relay L2, front contact 244 of relay L3, front contacts 245, 246 and 247 of relays E3, E2 and E1, respectively, wire 190, and front contacts 191 and 189 of relays 10P1 and 10P3, respectively. Thus, the entrance counting relays E1, E2 and E3 operated to open one energizing circuit for relay 10CKP through wire 177 and closed another through wire 190. The two networks of contacts of relays E1, E2 and E3 will always be, one or the other, closed to energize relay 10CKP unless more than one train occupies track sections 10T and 11T.

If the front of a second train is detected entering track section 10T before the first train leaves, the energizing circuits for relay 10CKP are opened successively. Back contact 188a of relay 10R1 opens one energizing circuit and the energizing circuit including wire 190 is opened at front contact 191 of relay 10P1 when relay 10P1 is deenergized by the opening of back contact 179a of relay 10R1. Relay 10P1 operates the relays E1, E2 and E3 to the condition defined by step 3 in Fig. 8. This causes energy to be restored to wire 177, but front contact 193 of relay 10CKP is already open to prevent the circuit from affecting relay 10CKP.

The detected passage of the rear of the second train operates relays 10R2 and 10P2 in succession, as before, and results in the operating of relays E1, E2 and E3 to the condition defined by step 4 in Fig. 8.

Relay 10CKP remains deenergized until the first train is detected completely passing signal G12, at which time the line circuit is operated to momentarily energize relay 10CO. Relay 10CO operates relays L1, L2 and L3 to the successive conditions defined by steps 1 and 2 in Fig. 8. Relay 10CKP can now be energized through front contacts 248, 249 and 250 of relays L1, L2 and L3, respectively, back contact 251 of relay E3, front contact 252 of relay E2, back contact 247 of relay E1, wire 190, and front contacts 191 and 189 of the respective relays 10P1 and 10P3.

Inspection of the counting relay contact networks, the sequence chart in Fig. 8 and the other described energizing circuits for relay 10CKP will show that relay 10CKP is deenergized whenever more than one train occupies track sections 10T and 11T at any time, and that relay 10CKP is energized whenever less than two trains occupy the track sections at any time.

Since relays 10CK and 10CKP operate to condition the line circuit between signal location G10 and G12, specific attention can be given to correlate train movements with the operation of the line circuit in response to operations of these relays. As previously noted, the control relays for the intermediate signal G11 are both normally energized when the line wires 10—12L1 and 10—12L2 are energized by the battery B1. Under such conditions, the track section between signal locations G10 and G12 is unoccupied. The detected passage of a first train into the stretch of track results in the deenergization of relay 10CK which pole changes the line circuit, causing the biased relay 11GB to be deenergized. When the train is detected passing signal G12 location, the circuits at that location operate to connect, momentarily, a battery B2 to the line circuit in series with and in opposition to battery B1. The resulting momentary change in direction of current in the line circuit is correct for causing the picking up and dropping away of the check out relay 10CO. The operation of relay 10CO advances the exit counting relays through two operational steps, resulting in the picking up of relay 10CK. The line circuit at this time is returned to its initial conditions whereby it is energized by battery B1, and relays 11GB and 11GR are both in their normal picked up states.

During the time when a train occupies the track between signal locations G10 and G12, the detection of a second train at signal G10 location results in the deenergization of relay 10CKP. Relay 10CKP disconnects the battery B1 from the line circuit and inserts the limiting resistor 201. The deenergization of the line circuit causes relay 11GR at signal G11 location to be deenergized. These conditions prevail until the first train is detected passing signal G12 location, at which time a battery B2 is connected momentarily to the line wires. The resulting direction of current in the line circuit is correct for picking up relay 10CO, but the line polarity is incorrect for picking up the biased polar relay 11GB. Relay 11GR does not pick up because of its slow pick-up characteristics, as described. The operation of relay 10CO in response to the momentary application of battery B1 to the line wires causes the exit counting relays to advance through two more operational steps, thereby providing circuit means for picking up relay 10CKP. Relay 10CKP then alters the line circuit so that battery B1 is again connected to it, but the polarity of the line circuit is incorrect for operating relay 11GB at signal G11 location, and will remain so until the detection of the second train at signal G12 location causes another momentary connecting of a battery B2 to the line circuit. When this happens, the direction of current in the line circuit is correct for operating relay 10CO. Relay 10CO operates the exit counting relays at signal G10 location to permit the picking up of relay 10CK which, in turn, restores the line circuit to normal. The polarity of the line circuit is then correct for picking up relay 11GB.

The operation of the various signals will be described after first describing the entrance and exit indicators in Fig. 4B. The entrance indicators consist of four lamps numbered 0, 1, 2 and 3. The lamps indicate the number of trains which have been detected entering track section 10T. The similar exit indicators are numbered in an identical manner and indicate the number of trains detected leaving track section 11T. The mode of operation of the two sets of indicators is such that a comparison is made between them to determine the number of trains occupying the stretch of track. Initially, the entrance indicator 0 is energized by a circuit including front contact 253 of relay E3, back contact 254 of relay E2, and back contact 255 of relay E1. When a train is detected entering the track section 10T, the entrance counting relays advance through two steps and provide an energizing circuit for the entrance indicator 1 through front contacts 253, 256 and 257 of relays E3, E2 and E1, respectively. The exit indicators are operated in a similar manner by the exit counting relays. It is assumed that the indicators can be provided at each block signal location to inform train crews of the track occupancy conditions in advance. Similar indicators can be provided at the office of a central dispatcher to provide information relevant to track occupancy conditions.

It must be noted that the entrance and exit indicators are operated cyclically by successive train detections. As three successive trains are detected entering track section 10T, the entrance indicators 1, 2 and 3 are operated singly in succession. A fourth entering train causes the entrance indicator 0 to be energized. Thus, from initial conditions, the entrance indicator 0 is energized in response to the detection of the fourth, eighth, twelfth, etc. trains; the entrance indicator 1 is energized in response to the first, fifth, ninth, etc. trains. Indicators 2 and 3 operate similarly as the operating cycles of the counting relays E1, E2 and E3 progress. The difference between the indicators is indicative of the number of trains occupying the track sections 10T and 11T. Simple subtraction of the number indicated by the exit indicators from the number indicated by the entrance indicators is possible when the exit number is smaller than the entrance number. When the exit number is larger than the entrance number, however, four must be added to the entrance number before subtracting. Obviously, when both indicators give the same number, the number of occupying trains could be zero or four. It is assumed, therefore, that no more than three trains can ever occupy track sections 10T and 11T concurrently. If more trains could occupy the track sections, the counting relay banks would require additional relays. For example, expanding each counter to include four relays would provide for operating cycles of 16 steps each, and it would take eight detected trains to operate a counter through a complete cycle; and each group of indicators would include eight lamps numbered 0 through 7.

The indication means shown here is assumed for illustration. Other types can be used to give indications of any number of trains on a step-by-step basis. Reset circuits can be easily incorporated to set such indicators to zero periodically so that counting can begin over again when a maximum is reached.

The control circuit for signal G10 includes contacts 260 and 261 of the repeater relay 11YGP which determines the polarity of the signal control circuit. The circuit also includes wires 262 and 263, back contact 264 of relay 10CO, wires 265 and 266, front contact 267 of the manual check-out button 10MCB, front contact 268 of relay 10CK, front contact 269 of relay 10CKP, front contact 270 of relay 10P3, front contact 271 of relay 10P1, contact 272 of the emergency release button 10ERB, and front contact 273 of track relay 10TR. Signal G10 is initially operated to display a stop aspect when relay 10P1 is deenergized. Signal G10 can be controlled to display a proceed aspect only when relay 10P1 and all of the other relevant relays are in their normal operating conditions. Contacts of the various pushbuttons are provided to prevent the clearing of signal G10 while such pushbuttons are being operated.

The marker signal associated with signal G11 is normally energized through contacts 275 and 276 of relays 11GR and 11GB, respectively. Signal G11 mechanism is controlled by a circuit including front contact 277 of relay 11GR and front contact 278 of a track relay 11TR. The detection of a single train passing signal G10 location causes the deenergization of relay 11GB which extinguishes the marker signal associated with signal G11. The detection of a subsequent train results in the deenergization of relay 11GR which further opens the energizing circuit for the marker signal and also operates signal G11 to display a stop aspect. The operation of signal G11 and its associated marker signal is similar to that previously described with reference to Figs. 3A and 3B, with the exception that the intermediate signal and marker signal are subject to automatic clearing when the last of a plurality of trains is detected leaving track sections 10T and 11T. Whenever the block is occupied by a single detected non-shunting train signal G11 will display a proceed aspect, but the associated marker signal will be dark. Occupancy by a plurality of trains causes the signal G11 to display a stop aspect, the marker signal being dark. Under such multiple occupancy conditions the detected departures of trains from the block operates the counting relays until the detected difference between entering and leaving trains is one. At this time the line circuit is conditioned by the picking up of relay 10CKP so that relay 11GR is picked up by battery B1, resulting in the permissible clearing of signal G11, but the marker remains dark. Thus, a return to single occupancy from multiple occupancy conditions does not restrict traffic.

The preceding description of the operation of the circuits in Figs. 4A–4C omitted specific reference to the operation of the detection repeater relay 10P3 and assumed that the front and rear of each train was detected. If an apparatus failure prevents the detection of the front of a train, but the rear is detected, relay 10P3 is deenergized by the opening of its stick circuit at back contact 180 of relay 10R2. The deenergization of relay 10P3 results in the opening of its front contacts which cause the following operations: front contact 224 opens the line circuit to signal G9 location, preventing automatic check-out operations; front contact 186 opens to deenergize relay 10CK; front contacts 189 and 194 open to deenergize relay 10CKP; front contact 176 opens to deenergize relay 10P1; front contact 270 opens to operate signal G10 to display a stop aspect. These conditions will continue to exist until the abnormal conditions are corrected by the authorized use of the emergency release button 10ERB which will restore relays 10P3 and 10P1.

*Summary*

In its described forms, the present invention provides means for detecting special non-shunting trains and for providing signalling protection for such trains. The combined use of the present detection circuits and standard track circuits has been described to show operational compatability.

In every form, the present invention includes cooperating train-carried and wayside entrance and exit detection apparatus for detecting the passage of both the front and the rear of each train. The detection of either the front or the rear of a train passing a signal location causes the signal to display a stop aspect. In order to be sure that a complete train leaves a section, both the front and the rear of a train must be detected passing a signal location before the circuits can operate the preceding signal to display a proceed aspect.

The forms shown in Figs. 3A, 3B, 4A–4C and 5, provide circuit means for use in block signaling systems, wherein permissive signals are employed and special detection apparatus is provided at entrance signal locations only. These forms provide for counting trains which enter and leave a stretch of track for controlling the entrance signal in accordance with track occupancy conditions. Special circuit means are also provided for operating intermediate signals in advance of a special train, and special signaling means is provided to govern one or more special trains which occupy a block concurrently.

The forms of the present invention disclosed herein have implied single direction traffic conditions. However, double direction running can be permitted with obvious circuit modifications. For example, the train-carried apparatus can be mounted on one particular side of each special train. The wayside detection apparatus for detecting trains moving in one direction can be located at one side of the track, while detection apparatus for detecting trains moving in the other direction can be located at the other side of the track. Thus, two networks of detection circuits can be provided to detect both directions of traffic and to control signals jointly in accordance with well-known signaling principles.

Although the detection apparatus described has been limited, for purposes of illustration, to a selective frequency type, other types of electrical or mechanical apparatus can be used. The described use of train-carried transmitters and wayside receivers is also not a limitation, because both transmitters and receivers can be located at the wayside and disposed to be coupled by tuned train-carried coupling circuit means.

It must be noted that the present disclosure assumes, for illustration, that wayside signals are employed. However, the principles of the present invention are applicable to cab signalling systems as well. The basic difference is that in a cab signalling system the detection circuit means would be used to selectively control the code rates used in general practice to indicate track conditions to train-carried receivers.

Having described a railway signalling system for the protection of trains incapable of consistently shunting detector track circuits as one specific embodiment of the present invention, it is desired to be understood that this form is selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention.

What I claim is:

1. In a railway signaling system, a stretch of track divided into a plurality of track sections, a signal located at the entrance to each track section, train-carried apparatus mounted at the front and rear of a train, said front train-carried apparatus being capable of supplying output energy of a particular character, and said rear train-carried apparatus being capable of supplying output energy of a different character, wayside detection circuit means at the entrance to each track section distinctively responsive to the characteristically different output energies of said front and rear train-carried apparatus when said train-carried apparatus and said wayside detection means are in proximity upon the passage of a train, and signaling circuit means for each track section controlled to a stop condition by the distinctive response of said associated wayside detection circuit means when a front train-carried apparatus is detected and controlled to a proceed condition by the distinctive response of said wayside detection circuit means at the next signal location in advance when a rear train-carried apparatus is detected.

2. In a signaling system for railroads, a stretch of track divided into track sections, a signal located at the entrance to each track section, wayside apparatus adjacent the track at each signal location for detecting the passage of a train, said wayside apparatus including one device responsive to energy of one frequency and another device responsive to energy of a different frequency, train-carried apparatus including a device at the front end of the train having an output energy of said one frequency and a device at the rear of the train having output energy of said different frequency, and circuit means at each signal location controlled by the wayside apparatus for that location by its said one device in response to said one frequency for causing the associated signal to display a stop aspect, said circuit means being controlled by the wayside apparatus for the signal next in advance when its said another device responds to said different frequency for causing said associated signal to display a proceed aspect, whereby the movement of the front end of a train past a signal causes that signal to display a stop aspect which is not changed to a proceed aspect until the rear of that train has passed the signal next in advance.

3. In a railway signaling system, a stretch of track divided into a plurality of track sections, a signal located at the entrance to each track section, train entrance detection circuit means at each signal location distinctively operable in response to energy of a particular frequency, train exit detection circuit means at each signal location distinctively operable in response to energy of a different frequency, train-carried apparatus at the front and rear of a train, said front train-carried apparatus having an output energy of said particular frequency and said rear train-carried apparatus having an output energy of said different frequency, circuit means at each signal location operable in response to operations of said associated entrance detection circuit means caused by the proximate passage of said front train-carried apparatus for controlling the associated signal to display a stop aspect, and circuit means at each signal location operable to cause the signal to display a proceed aspect in response to operations of the exit detection circuit means at the next signal location in advance caused by the proximate passage of said rear train-carried apparatus.

4. In a railway signaling system, a stretch of track divided into a plurality of track sections, train entrance detection circuit means at the entrance to each track section distinctively operable in response to energy of a particular character, train exit detection circuit means at the entrance to each track section distinctively operable in response to energy of a different character, train-carried apparatus at the front and rear of a train, said front train-carried apparatus having an output energy of said particular character and said rear train-carried apparatus having an output energy of said different character, signaling means for each track section operable in response to operations of said associated entrance detection circuit means caused by the proximate passage of said front train-carried apparatus for operating the associated signaling circuit means to a stop condition, said signaling circuit means for each track section being also operable to a proceed condition in response to operations of the exit detection circuit means at the entrance to the next track section in advance caused by the proximate passage of said rear train-carried apparatus.

5. In a railway signaling system, the stretch of track divided into a plurality of track sections, a signal located at the entrance to each track section, entrance detection apparatus at each signal location comprising a wayside transmitter connected to an energy source having a particular output frequency and a wayside receiver connected to entrance detection circuit means distinctively operable in response to energy of said particular frequency, said wayside transmitter and receiver being located so that the output energy of said energy source is capable of operating said entrance detection circuit means only when said transmitter and receiver are effectively coupled by external means, exit detection apparatus at each signal location comprising a wayside transmitter connected to an energy source having a different output frequency and a wayside receiver connected to exit detection circuit means distinctively operable in response to energy of said different frequency, said wayside transmitter and receiver being located so that the output energy of said energy source is capable of operating said exit detection circuit means only when said transmitter and receiver are effectively coupled by external means, train-carried entrance and exit circuit means located, respectively, at the front and rear of a train and disposed to be capable of coupling said cooperating wayside transmitters and receivers upon the passage of a train, said entrance circuit means being tuned to said particular frequency and said exit circuit means being tuned to said different frequency so that said entrance transmitter and receiver can be effectively coupled upon the passage of the front of a train only and said exit transmitter and receiver can be effectively coupled upon the passage of the rear of a train only, circuit means at each signal location for operating the signal to display a stop aspect in response to operations of the associated entrance detection circuit means caused by the passage of the front of a train, and circuit means at each signal location for operating the signal to display a proceed aspect in response to operations of the exit detection circuit means at the next signal location in advance upon the passage of the rear of a train.

6. In a system for controlling railway signals to provide protection for trains, wayside entrance and exit apparatus at each signal location for detecting the passage of trains, train-carried entrance and exit apparatus located, respectively, at the front and rear of a train, said train-carried entrance and exit apparatus being capable, respectively, of distinctively operating said wayside entrance and exit apparatus whenever said train-carried apparatus is brought into proximity with said respective cooperating wayside apparatus, circuit means at each signal location for operating the signal to display a stop aspect in response to operations of either one or both of said associated wayside entrance and exit apparatus upon the passage of a train, and circuit means at each signal location responsive to joint operations of said associated wayside entrance and exit apparatus upon the passage of a train for rendering the signal at the preceding signal location operable to display a proceed aspect.

7. In a system for controlling railway signals for the protection of trains, electroresponsive entrance and exit detection means at each signal location for detecting the passage of trains, train-carried entrance and exit circuit means located, respectively, at the front and rear of a train, said train-carried entrance and exit circuit means being capable, respectively, of distinctively operating said wayside entrance and exit detection means whenever said train-carried apparatus is brought into proximity with said respective cooperating wayside detection means, circuit means at each signal location for operating the signal to display a stop aspect in response to operations of either one or both of said associated wayside entrance and exit detection means upon the passage of a train, and circuit means at each signal location responsive to joint operations of said associated wayside entrance and exit detection means upon the passage of a train for rendering the signal at the preceding signal location operable to display a proceed aspect.

8. In a system for controlling railway signals, entrance and exit transmitter means located, respectively, at the front and rear of a train, said entrance and exit transmitter means being normally operative to provide respective output energies having mutually distinguishable characteristics, electroresponsive wayside entrance and exit detection circuit means at each signal location, said wayside entrance and exit detection means being distinctively operable, respectively, in response to the output energies of said entrance and exit transmitter means whenever said cooperating transmitter means and detection circuit means are brought into proximity upon the passage of a train, circuit means at each signal location responsive to operations of said associated entrance detection circuit means for controlling the associated signal to display a stop aspect upon the passage of a train, circuit means at each signal location responsive to operations of said associated entrance and exit detection circuit means for controlling the associated signal to display a stop aspect whenever said exit detection circuit means is operated but said entrance detection circuit means fails to be operated upon the passage of a train, and circuit means at each signal location responsive to operations of both of said associated entrance and exit detection circuit means upon the passage of a train for rendering the signal at the preceding signal location operable to display a proceed aspect.

9. In a system for controlling railway signals, wayside train detection circuit means including an entrance detection relay and an exit detection relay at each signal location, said detection circuit means being distinctively operable to energize either said entrance detection relay or said exit detection relay and also being distinctively operable to at times energize both said entrance and said exit detection relays, train-carried entrance and exit circuit means located, respectively, at the front and rear of a train, said entrance and exit circuit means being capable when in proximity with said wayside detection circuit means of operating said detection circuit means to energize said entrance detection relay when the front of a train passes and to energize said exit detection relay when the rear of a train passes, an entrance repeater relay, an exit repeater relay and a detection repeater relay at each signal location, circuit means at each signal location responsive to operations of the associated entrance and exit detection relays for operating the associated entrance repeater relay from a normal to an operated condition when the front of a train is detected and for operating the associated exit repeater relay when the rear of a train is detected, circuit means at each signal location responsive to operations of the associated entrance and exit repeater relays for operating the associated detection repeater relay from a normal to a sustained operated condition when only the rear of a passing train is detected, manually operable release circuit means at each signal location for operating the associated detection repeater relay to its normal condition, circuit means at each signal location responsive to operations of the associated entrance, exit and detection repeater relays for operating the entrance repeater relay at the next preceding signal location from its operated to its normal condition, said circuit means being effective only when both said associated entrance and exit repeater relays are operated by the passage of a train, and signal control circuit means at each signal location responsive to the associated entrance and detection repeater relays for controlling the associated signal to display a proceed aspect only when both the associated entrance and detection repeater relays are in their normal conditions.

10. In a system for controlling railway signals, normally operative train-carried entrance and exit circuit means located, respectively, at the front and rear of a train, said entrance and exit circuit means having respective output energies which are mutually distinguishable in character, electroresponsive wayside entrance and exit detection circuit means at each signal location, said entrance and exit detection circuit means being distinctively operable, respectively, in response to the output energies of said train-carried entrance and exit circuit means during the passage of a train, electromechanical wayside train detection means at each signal location having a normal operating position and an actuated position, said electromechanical detection means being disposed to be subject to operation from its normal to its actuated position in response to either electrical energization or mechanical actuation by a passing train, circuit means at each signal location responsive to operations of the associated entrance detection circuit means for electrically operating the associated electromechanical detection means when the front of a train is detected by said entrance detection circuit means, circuit means at each signal location for operating the associated signal to display a stop aspect in response to the independent or joint operation of the associated entrance detection circuit means and the associated electromechanical detection means respectively, by the passage of the front of a train, and circuit means at each signal location for operating the associated signal to display a proceed aspect in response to joint operations of the entrance and exit detection circuit means at the next signal location in advance.

11. In a system for controlling railway signals, wayside train entrance and exit detection circuit means operable to detect the passage of the front and rear of a train, train-carried entrance circuit means located near the front of a train and train carried exit circuit means located near the rear of a train each having distinctive respective output energies for distinctively operating said wayside detection circuit means, an electromechanical wayside train detection device at each signal location comprising an arm normally disposed to be actuated by a train, an electromagnet capable when energized of retracting said arm from the path of the train, pluralities of electrical contacts disposed to be operated distinctively in either operating positions of said arm, mechanical locking means effective to lock said arm in its operated position only when said arm is mechanically actuated by a train, and manual restoration means for releasing said locking means; circuit means at each signal location responsive to operations of the associated detection circuit means caused by the detected passage of the front of the train for energizing the electromagnet included in the associated electromechanical detection device, thereby retracting the associated arm from the path of the train, circuit means at each signal location responsive to operations of either one or both of the associated detection circuit means and electromechanical detection means for operating the associated signal to display a stop aspect, and circuit means at each signal location responsive to operations of the associated detection means in response to the detected passage of an entire train for operating the signal at the preceding signal location to display a proceed aspect.

12. In a railway signaling system for the protection of trains which are either capable or incapable of reliably shunting track circuits, a stretch of track divided to form a plurality of track sections, a signal at the entrance to each track section, train-carried entrance and exit circuit means mounted, respectively, at the front and rear of a non-shunting train, said entrance and exit circuit means having respective output energies which are mutually distinguishable in character, wayside entrance and exit detection circuit means at each signal location, said entrance detection circuit means being responsive to the output of said train-carried entrance circuit means, said exit detection circuit means being responsive to the output of said train-carried exit circuit means, an entrance repeater relay and an exit repeater relay at each signal location, circuit means at each signal location responsive to operations of the associated entrance detection circuit means upon the passage of the front of a non-shunting train for operating the associated entrance repeater relay from a normal to a sustained operated position, circuit means at each signal location responsive to operation of the associated exit detection circuit means upon the passage of the rear of a non-shunting train for operating the associated exit repeater relay, a track relay and a restoration relay associated with each track section and the associated entrance signal location, circuit means at each signal location responsive to operations of the associated entrance repeater relay for selectively connecting either the associated track relay or restoration relay to the rails of the associated track section, said circuit means including sufficient resistance to render the restoration relay operable in response to a higher level of energy than that required to operate the track relay, energy supply circuit means associated with each track section and being responsive to operations of the entrance and exit repeater relays at the next signal location in advance for selectively applying energy to the rails of the track section, whereby sufficient energy is normally applied to pick up a track relay and a higher level of energy sufficient to operate a restoration relay is applied upon the detected passage of a train, circuit means at each signal location responsive to operations of the associated restoration relay for operating the associated entrance repeater relay to its normal condition when a non-shunting train is detected passing the next signal location in advance, and signal control circuit means for each signal responsive to operations of the associated entrance and exit repeater relays for operating the signal to display a stop aspect when the associated track section is occupied by a train.

13. In a system for controlling railway signals, wayside train entrance and exit detection apparatus at each signal location for detecting the passage of trains, train-carried entrance and exit apparatus located, respectively, at the front and rear of the train and being capable, respectively, of distinctively operating said wayside entrance and exit apparatus during the passage of the train, entrance and exit repeater circuit means at each signal location for registering the detected passage of a train, said entrance repeater circuit means being operated from a normal to a sustained operated position in response to the detected passage of the front of the train, restoration circuit means at each signal location for operating the associated entrance repeater circuit means to its normal condition in response to operations of the entrance and exit repeater circuit means at the next signal location in advance, multiple occupancy detection circuit means at each signal location responsive to operations of the associated wayside entrance and exit apparatus and the associated entrance repeater circuit means for detecting the passage of a second train at a signal location before a first detected train passes the next signal location in advance, and circuit means at each signal location responsive to operations of the associated entrance repeater circuit means, the associated multiple occupancy detection circuit means and the associated restoration circuit means for operating the associated signal to display a stop aspect in response to the passage of one or more trains and to operate the signal to display a proceed aspect when all such detected trains are detected passing the next signal location in advance.

14. In a system for controlling railway signals, wayside train detection circuit means including an entrance detection relay and an exit detection relay, said circuit means being distinctively operable in response to energies of particular characters to selectively operate said entrance and exit detection relays, train-carried entrance and exit circuit means mounted, respectively, at the front and rear of a train and having respective output energies which are mutually distinguishable in character for distinctively operating said wayside detection circuit means, repeater circuit means at each signal location including an entrance repeater relay and an exit repeater relay, said repeater circuit means being responsive to operations of the associated entrance and exit detection relays to deenergize said entrance repeater relay when the front of the train passes and to energize said exit repeater relay when the rear of the train passes, circuit means at each signal location for energizing the associated entrance repeater relay in response to operations of the entrance and exit repeater relays at the next signal location in advance by a passing train, multiple entrance detection circuit means at each signal location for detecting the entrance of a second train before a preceding train is detected passing the next signal location in advance, said multiple occupancy circuit means being operable from a normal to a sustained operated condition in response to operations of the associated entrance and exit detection relays and the associated entrance repeater relay, manually operable restoration circuit means at each signal location for operating the multiple occupancy detection circuit means at the next signal location to the rear, and signal control circuit means at each signal location responsive to operations of the associated repeater circuit means and multiple occupancy detection circuit means for operating the signal to display a stop aspect when one or more trains are detected passing the signal location and for maintaining the stop aspect until such trains are detected passing the next signal location in advance and, in the case of multiple occupancy, the manually operable restoration means at the next signal location in advance is operated.

15. In a system for controlling railway signals, normally operative train-carried entrance and exit circuit means mounted, respectively, at the front and rear of a train and having respective output energies of mutually distinguishable characteristics, wayside entrance and exit detection circuit means at each signal location responsive, respectively, to the output energies of said train-carried entrance and exit circuit means, repeater circuit means at each signal location responsive to operations of the associated entrance and exit detection circuit means for registering the passage of a train, entrance counting circuit means at one signal location responsive to operations of the associated repeater circuit means for registering each train passing said one signal, exit counting circuit means at said one signal location responsive to operations of the repeater circuit means at the next signal location in advance for registering each train leaving the territory governed by said one signal, check circuit means at said one signal location responsive to operations of the associated entrance and exit counting circuit means for detecting the presence of trains in the track section governed by said one signal which have not been detected passing the next signal location in advance, and circuit means at each signal location responsive to operations of the associated repeater circuit means and check circuit means for operating the associated signal to display a stop aspect until all trains detected entering the track section governed by said one signal have been detected leaving the track section.

16. A system for controlling railway signals to provide protection for trains which are capable of producing continuous effective shunts in track circuits and also for trains which are incapable of producing continuous effective shunts in track circuits, a stretch of track divided into a plurality of track sections, a signal located at the entrance to each track section, track circuit means for each section including a track relay connected across the rails at one end of its section and a source of energy connected across the rails at the opposite end of its section to normally energize such track relay, said track relay being continually deenergized only in response to trains capable of producing effective train shunts, train-carried entrance inductive apparatus located at the front end of each train ineffective to continually shunt said track circuits, wayside entrance detection apparatus located at each signal location and being inductively affected by said train-carried entrance apparatus upon the passage of the front end of said train, train-carried exit inductive apparatus located at the rear end of each train ineffective to continuously shunt said track circuits, wayside exit detection apparatus located at each signal location and being inductively affected by said train-carried exit apparatus upon the passage of the rear end of said train, circuit means for each signal governed by the respective track relay for operating that signal to display a stop aspect in response to the effective shunting of said respective track circuit means, other circuit means for each signal controlled by said wayside entrance and exit detection apparatus for that signal location for operating that signal to display a stop aspect when either said entrance or said exit detection apparatus has been inductively affected by the respective train-carried apparatus, and detector circuit means at each signal location governed jointly by both said train entrance and train exit detection apparatus at that location for rendering the signal at the preceding signal location operable to display a proceed aspect provided that said track relay associated with said preceding signal location remains energized.

17. A railway signaling system for governing passage of trains along a stretch of track having a plurality of spaced points for the location of wayside apparatus comprising in combination, normally energized check-in and check-out coils on the front and rear ends of a train respectively, wayside check-in and check-out coils at each of said spaced points disposed to cooperate inductively with the train carried check-in and check-out coils respectively, check-in circuit means actuated in response to the inductive coupling of said train carried check-in coil with said wayside check-in coil at each of said points for registering occupancy for a portion of the trackway between the point of actuation and the next point in advance, check-out circuit means actuated in response to the inductive coupling of said train carried check-out coil with said wayside check-out coil at each of said points for registering the exit of a train between the check-out point and the next point in the rear, signal means for indicating stop and proceed conditions, and means controlled by the actuation of said check-in circuit means and said check-out circuit means for adjacent points for controlling said signal means.

References Cited in the file of this patent

UNITED STATES PATENTS

| | | |
|---|---|---|
| 2,030,924 | Kemmerer | Feb. 18, 1936 |
| 2,189,879 | Brown | Feb. 13, 1940 |
| 2,509,331 | Brannen | May 30, 1950 |
| 2,609,488 | Fletcher | Sept. 2, 1952 |
| 2,620,435 | Vogt | Dec. 2, 1952 |
| 2,670,434 | Groenendale | Feb. 23, 1954 |
| 2,710,341 | Winkler | June 7, 1955 |